(12) United States Patent
Lin

(10) Patent No.: US 11,243,927 B2
(45) Date of Patent: Feb. 8, 2022

(54) METHOD FOR RETRIEVING DATA OBJECT BASED ON SPATIAL-TEMPORAL DATABASE

(71) Applicant: Beijing Wellintech Co., Ltd., Beijing (CN)

(72) Inventor: Wei Lin, Beijing (CN)

(73) Assignee: Beijing Wellintech Co., Ltd., Beijing (CN)

( * ) Notice: Subject to any disclaimer, the term of this patent is extended or adjusted under 35 U.S.C. 154(b) by 257 days.

(21) Appl. No.: 16/343,210

(22) PCT Filed: Sep. 4, 2017

(86) PCT No.: PCT/CN2017/100377
§ 371 (c)(1),
(2) Date: Apr. 18, 2019

(87) PCT Pub. No.: WO2018/076930
PCT Pub. Date: May 3, 2018

(65) Prior Publication Data
US 2019/0266138 A1    Aug. 29, 2019

(30) Foreign Application Priority Data

Oct. 24, 2016 (CN) .......................... 201610925967.X
Oct. 24, 2016 (CN) .......................... 201610925969.9
(Continued)

(51) Int. Cl.
*G06F 16/00* (2019.01)
*G06F 16/22* (2019.01)
(Continued)

(52) U.S. Cl.
CPC .............. *G06F 16/22* (2019.01); *G06F 16/00* (2019.01); *G06F 16/212* (2019.01); *G06F 16/29* (2019.01)

(58) Field of Classification Search
CPC ........ G06F 16/00; G06F 16/212; G06F 16/22; G06F 16/243; G06F 16/29
(Continued)

(56) References Cited

U.S. PATENT DOCUMENTS 10,231,085 B1 * 3/2019 Kumar .............. G06F 16/24554
10,496,644 B2 * 12/2019 Chamieh ............... G06F 16/284
(Continued)

FOREIGN PATENT DOCUMENTS

| CN | 102023983 | 4/2011 |
|---|---|---|
| CN | 103425789 | 12/2013 |

(Continued)

OTHER PUBLICATIONS

International Search Report dated Dec. 5, 2017 in International Application No. PCT/CN2017/100377.

*Primary Examiner* — Michelle N Owyang
(74) *Attorney, Agent, or Firm* — Michael X. Ye; Rimon Law

(57) ABSTRACT

A method for retrieving data objects based on a spatial-temporal database includes modeling a to-be-managed object in consideration of temporal and spatial statuses of the to-be-managed object; setting specific attributes of the to-be-managed object that are expressed in a natural language according to resultant management models of the managed object; and performing retrieval based on types of the management models of the managed objects and a spatial and/or temporal attribute that is expressed in the natural language and defined by the models so as to determine the operational status of the to-be-managed object. Since data information about monitoring and management of production is described over three temporal periods that are associated to historical data, real-time data and plan data, a user can know spatial-temporal operational statuses of the to-be-managed object by performing retrieval using a spa-
(Continued)

tial-temporal metalanguage, making data management simple and saving storage in computers.

3 Claims, 3 Drawing Sheets

(30) Foreign Application Priority Data

| | | |
|---|---|---|
| Oct. 24, 2016 | (CN) | 201610925992.8 |
| Oct. 24, 2016 | (CN) | 201610926060.5 |
| Oct. 24, 2016 | (CN) | 201610927538.6 |
| Dec. 30, 2016 | (CN) | 201611271001.5 |

(51) Int. Cl.
  *G06F 16/21* (2019.01)
  *G06F 16/29* (2019.01)

(58) Field of Classification Search
  USPC .................................................. 707/600–899
  See application file for complete search history.

(56) References Cited

U.S. PATENT DOCUMENTS

| | | | | |
|---|---|---|---|---|
| 2004/0249848 | A1* | 12/2004 | Carlbom | G06F 16/40 |
| 2010/0058196 | A1* | 3/2010 | Krishnan | G06Q 10/10 |
| | | | | 715/747 |
| 2011/0202326 | A1* | 8/2011 | Salemann | G06F 16/29 |
| | | | | 703/6 |
| 2013/0198197 | A1* | 8/2013 | Sawhney | G06F 16/9537 |
| | | | | 707/741 |
| 2014/0047107 | A1* | 2/2014 | Maturana | G05B 19/056 |
| | | | | 709/224 |
| 2015/0058345 | A1* | 2/2015 | Mishra | G06Q 30/0261 |
| | | | | 707/737 |

FOREIGN PATENT DOCUMENTS

| | | |
|---|---|---|
| CN | 103678712 | 3/2014 |
| CN | 105426491 | 3/2016 |
| CN | 106294887 | 1/2017 |
| CN | 106294888 | 1/2017 |
| CN | 106407468 | 2/2017 |
| CN | 106407469 | 2/2017 |
| CN | 106446278 | 2/2017 |
| CN | 106649867 | 5/2017 |

* cited by examiner

METHOD FOR RETRIEVING DATA OBJECT BASED ON SPATIAL-TEMPORAL DATABASE

FIELD

The present invention relates to a method for managing industrial production and monitoring based on a spatial-temporal database, and more particularly to a method for retrieving data objects based on a spatial-temporal database.

BACKGROUND OF THE INVENTION

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

Spatial-temporal database models used nowadays primarily are sequent snapshots, spatial-temporal cube models, base state with amendments models, and space-time composite models. These models each have characteristics as well as strengths and weaknesses, yet none of them is perfect for statistical applications. Some concepts of spatial-temporal database models, such as the idea about object-oriented spatial-temporal models, feature-based spatial-temporal database models, event-based spatial-temporal database models and the like, use either an object-oriented approach or a variation-based method to record spatial changes and relations. Nevertheless, these known schemes are somehow insufficient to deal with the complicated indexes and numerous statistic levels in a spatial-temporal database, and fail to meet the demands of statistics divisions in terms of business adaptability.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

China Patent No. CN103678712A discloses a disaster information spatial-temporal database that includes three information databases, namely a disaster current situation database; a disaster process database and a disaster historical database, a unified coding module carrying out layered coding on the received disaster information data; an attribute data management module and a space position management module introducing disaster information attribute data and space position data to the corresponding disaster information database; a logic conversion module allowing the disaster information data to be transmitted among all disaster information databases; and a spatial-temporal database index module building updating index for the disaster information spatial-temporal databases according to time sequence. The logic conversion module and the spatial-temporal database index module form the basis of the disaster information spatial-temporal database so as to achieve management and maintenance of the disaster attributes, conversion and maintenance of the spatial-temporal logic indexes, entry, retrieval and spatial-temporal inquiries of the statistics data. The shortcomings of the prior patent include: (1) it is impossible to directly conduct search in the relational database by entering temporal or spatial information; and (2) the retrieval is limited to a specific temporal range, and retrieval in a spatial range is impossible.

Currently, most spatial databases support spatial information by means of stored coordinate information, and use a self-growing ID (Identity) for indexing, so spatial structure algorithms are essential for data search. As solutions to the foregoing problem, many patents have tried to use simpler spatial indexing methods.

China Patent No. CN102622349B discloses a method for processing a positional information database that includes: obtaining a spatial position coordinate data; generating spatial position information encoding corresponding to the spatial position based on the coordinate data, comprising: defining a five-section spatial position information encoding rule applied to the geographical territory of China that is embodied as Country code—Area code: Subcode 1: Subcode 2—Additional code. The encoding rule implements a top-down principle, left-right numbering principle. A spatial position information database stores the spatial location information codes as indexes and position information of the spatial locations in the database. The shortcomings of the prior patent include: (1) the spatial description is not accurate and precise enough, particularly not distinctive for the top and bottom sections of some equipment in a factory; (2) the spatial analytics and encoding are not facile in terms of querying and calling data, and require special encoding rules; and (3) the database is not automatically updated as the physical location changes.

In application systems that use a relational database to store information, there are numerous multi-dimensional queries. This kind of queries provide multi-dimensional query rules for users to follow, and what the users want is to find information in a simple, fast and smart manner. To this end, databases have been optimized for query processing in the following ways: (1) reasonable use of indexes wherein separate and orderly storage structures are created for arranging data in a relational database by queried field, thereby improving query processing performance; (2) redundant relational data: wherein information from correlation tables is stored in a separate bivariate table as redundancy, thereby reducing association relationship during query processing and improving query processing performance; and (3) separate storage of big data, wherein big data is divided and separately stored by data type, thereby improving query processing performance.

China Patent No. CN100483411C discloses an information retrieval method of a relational database comprising the steps of: building a strategy tree for dimensional reduction and placing it in a database system, wherein the strategy tree for dimensional reduction includes at least one sub-node and at least one root node, each sub-node containing at least the current node identification number, the query condition combination and lower sub-node number identification; when a query obeying a query rule made to said database does not yield the desired data, building new query rules successively according to the strategy tree for dimensional reduction; performing retrieval in the database according to the new query rules until the desired data is obtained or until dimensional reduction reaches the root node of the strategy tree and no information on the desired data is reported. The prior patent is however not easy to use. In particular, number-based ID information is required for querying and calling data. In the world of industrial process control, there are so many parameters for equipment and processes in terms of both type and quantity, but querying data by number is awkward. This has long been a problem in applications of traditional relational database that every object needs a unique ID for its data to be found through retrieval. It is thus believed that a method allowing retrieval to be performed using a certain location of equipment or using the time point of a certain process parameter would make data retrieval more efficient.

As described previously, the existing database structures are all built with a series of complicated defining or value-assigning procedures. Thus, input or output of data is impossible without a dedicated program written in a programming language by the original programmer. Besides, software maintenance or upgrade of the database can only be done using source codes provided by the original programmer, and a user has to enter specific ID when trying to query or call data in the database. Therefore, there is a need for a more convenient, efficient and low-cost database system that can improve performance of existing databases and can be realized through configuration.

SUMMARY OF THE INVENTION

In view of the shortcomings of the prior art, one aspect of the present invention provides a method for retrieving data objects based on a spatial-temporal database. The method involves modeling a to-be-managed object and performing retrieval based on types of resultant management models and spatial and/or temporal attributes of managed objects so as to determine an operational status of the to-be-managed object, and the method comprising steps of: modeling the to-be-managed object in consideration of temporal and spatial statuses of the to-be-managed object; setting a specific attribute of the to-be-managed object expressed in a natural language according to the management models of the managed objects; and performing retrieval based on the types of the management models of the managed objects and spatial and/or temporal attributes defined by the modeling and expressed in the natural language so as to determine the operational status of the to-be-managed objects.

According to one preferred mode, the step of modeling the to-be-managed object comprises: modeling the to-be-managed object according to the spatial status of the to-be-managed object, modeling the to-be-managed object according to the temporal status of the to-be-managed object, setting the specific attribute of the to-be-managed object, and collecting data from the to-be-managed object so as to perform dynamic monitoring and management of the to-be-managed object.

According to one preferred mode, the step of performing retrieval based on the types of the management models of the managed objects and spatial and/or temporal attributes defined by the models and expressed in the natural language so as to determine the operational status of the to-be-managed object comprises: based on the types of the management models, spatial locations and/or time points of the managed objects, retrieving real-time data, historical data and/or plan data of at least one said managed object at the spatial locations and/or the time points, thereby determining a real-time operational status, a historical operational status and/or a planned operational status of the to-be-managed object; or based on the types of the management models, spatial ranges and/or temporal ranges of the managed objects, retrieving real-time data, historical data and/or plan data of at least one said managed object within the spatial ranges and/or temporal ranges, thereby determining a real-time operational status, a historical operational status and/or a planned operational status of the to-be-managed object.

According to one preferred mode, the step of determining the operational status of the to-be-managed object further comprises: according to the types of management models of the managed objects determining a real-time database, a historical database and/or a plan database storing operational data of the managed object, according to the spatial attribute and/or the temporal attribute selecting at least one version of the operational data of the managed object that is associated with the managed object from the real-time database, the historical database and/or the plan database, and determining at least one said managed object that is associated with the management model, and checking the real-time data, the historical data and/or the plan data of that managed object, thereby knowing the real-time operational status, the historical operational status and/or the planned operational status of the to-be-managed object.

According to one preferred mode, the managed objects include real-time data objects stored in the real-time database, historical data objects stored in the historical database, and plan data objects stored in the plan database that are sorted and formed according to the temporal attribute; the real-time data objects include at least one managed object that is formed through model instantiation of the real-time data and is composed of the real-time data of the managed object; the historical data objects include at least one managed object that is formed through model instantiation of the historical data and is composed of the historical data of the managed object; and the plan data objects include at least one managed object that is formed through model instantiation of the plan data and is composed of the plan data of the managed object.

According to one preferred mode, the step of modeling the to-be-managed object in consideration of the temporal and spatial statuses of the to-be-managed object comprises: modeling space of the to-be-managed object according to the spatial status of the to-be-managed object so as to establish a spatial model, modeling time of the to-be-managed object according to the temporal status of the to-be-managed object so as to establish a temporal model, and building the management model that is formed by relating the spatial model to the temporal model of the to-be-managed object.

According to one preferred mode, the step of setting a specific attribute of the to-be-managed object expressed in a natural language according to the management models of the managed objects comprises: instantiating the management models so as to form at least one managed object consisting of the temporal object and the spatial object of the managed object which are related to each other, wherein the temporal object of the managed object is formed from the temporal model during instantiation, and the spatial object of the managed object is formed from the spatial model during instantiation.

According to one preferred mode, the step of setting a specific attribute of the to-be-managed object expressed in a natural language according to the management models of the managed objects further comprises: setting the specific attribute of the to-be-managed object, wherein the specific attribute includes a temporal attribute, a spatial attribute and/or a non-spatial-temporal attribute expressed in the natural language, wherein the non-spatial-temporal attribute includes attributes of a first data type and a second data type of the to-be-managed object, and the attribute of the second data type at least includes one or more of a graph attribute, an audio attribute, a video attribute and a name attribute of the to-be-managed object. Preferably, the first data type is a conventional data type, such as byte, bool, int8, short, ushort, int32, uint32, int64, uint64, float, double, string, datetime, enum or the like, while the second data type is an unconventional data type, such as one or more of blob, anytime, pen, brush, font, graph, audio, video, name and document.

According to one preferred mode, the temporal attribute at least includes a temporal location, a start time and an end time, in which where the to-be-managed object is a static object, the spatial attribute at least includes a geographic spatial range, a geographic spatial location and a spatial shape, a spatial range and a spatial location of a child space, and where the to-be-managed object is a dynamic object, the spatial attribute at least includes a geographic spatial location, a candidate geographic spatial location and a spatial shape, a spatial range and a spatial location of an upper-level spatial model of the to-be-managed object.

According to one preferred mode, the temporal model and the spatial model each has a multi-level structure labeled with names defined in the natural language, in which the multi-level structure of the temporal model includes at least one parent-level temporal layer expressed in the natural language and at least one child-level temporal layer corresponding to the parent-level temporal layer, and the multi-level structure of the spatial model includes at least one parent-level spatial layer expressed in the natural language and at least one child-level spatial layer corresponding to the parent-level spatial layer.

According to one preferred mode, the spatial attributes are described by implementing annotation of spatial information of the to-be-managed object according to the spatial status of the to-be-managed object, which involves: loading a geographic information coordinate system through a spatial object editor, and building a multi-level spatial object based on geographic location information and spatial status information of the to-be-managed object using rectangles, irregular polygons, points and polygonal lines, and implementing annotation of the spatial information of individual components of the multi-level structure of the to-be-managed object based on the multi-level spatial object.

According to one preferred mode, annotation of the spatial information is performed by: loading the geographic information coordinate system through the spatial object editor, drawing a spatial range of a root node based on the geographic location of the to-be-managed object, and drawing a spatial object in the range of the root node using rectangles, irregular polygons, points and polygonal lines, so as to obtain a first-level spatial object of the to-be-managed object; drawing, based on the upper-level spatial object, spaces of the components of the to-be-managed object level by level using rectangles, irregular polygons, points and polygonal lines, so as to obtain spatial objects of corresponding level to the components; and matching the spatial status of the to-be-managed object to the spatial objects in all levels, thereby achieving annotation of the spatial information to the multi-level and/or multi-layer to-be-managed object.

According to one preferred mode, the spatial shape is a physical shape of the to-be-managed object, wherein the physical shape of the to-be-managed object geometrically describes the spatial shape using points, lines, and planes; and the spatial range is an envelope of the to-be-managed object, wherein the envelope represents the to-be-managed object using rectangles or cubes; and length, width and height of the spatial range are calculated from the spatial shape of the to-be-managed object; the spatial location describes location information about where the to-be-managed object is located spatially, in which the location information includes exact location information and logic location information; wherein the exact location is at least a geographic coordinate location of the to-be-managed object, and the logic location is location information of and/or relationship between the individual components of the to-be-managed object, which includes location relationship between spatial objects of the same levels and location relationship between spatial objects of different said levels.

According to one preferred mode, the data of the to-be-managed object is collected by: directly collecting historical data of the to-be-managed object at site from the to-be-managed object or collecting the historical data of the to-be-managed object by means of calculation, collecting real-time data of the to-be-managed object by means of sensors or collecting real-time data of the to-be-managed object by means of calculation, or introducing plan needs through a third-party system interface and generating the plan data by means of calculation.

According to one preferred mode, the method further comprises performing a method for describing articles and events in an objective world based on a four-dimensional space before retrieving the data objects, and the method of description involves modeling the to-be-managed object so as to establish at least the historical database, the real-time database and the plan database that store temporal attribute of the to-be-managed object and the spatial attribute of the to-be-managed object.

According to one preferred mode, the method further comprises, after establishment of the historical database, the real-time database and the plan database by describing articles and events in the objective world based on the four-dimensional space, looking up the historical operational status, the planned operational status and/or the real-time operational status of the to-be-managed object by the types of the management models of the managed object, and the spatial attribute and/or temporal attribute expressed in the natural language.

According to one preferred mode, the method further comprises, after establishment of the historical database, the real-time database and the plan database by describing articles and events in the objective world based on the four-dimensional space, looking up the historical operational status, the planned operational status and/or the real-time operational status of the to-be-managed object by having the to-be-managed object perform subscription, wherein the subscription is performed by: having a client send a subscription request for at least one data record to the spatial-temporal database, wherein the subscription request includes the type of the management model, and the spatial attribute and/or the temporal attribute expressed in the natural language; and having the spatial-temporal database actively push, in response to the subscription request, to the client at least one data record that includes the spatial attribute and/or temporal attribute of to-be-managed object expressed in the natural language.

In the disclosed method, before making inquiries about objects, the rule of description has to be established. Preferably, in the present invention, the to-be-managed object is described through description of articles and events existing in an objective world based on a four-dimensional space. Retrieval of the to-be-managed object can be divided into two types, namely one-time query by spatial-temporal models and subscription by spatial-temporal models. The difference between the two types relies on that after the one-time query by spatial-temporal models is successful, the server send the query result for only one time, yet after the subscription by spatial-temporal models is performed, the server sends query results again when data variation within the spatial-temporal range is detected.

According to one preferred mode, both the query and subscription are performed through the management model types of the managed objects as well as the spatial attribute and the temporal attribute expressed in the natural language. A real-time database may contain to-be-managed objects of different real-time models, and these models are structurally different. By performing query or subscription using the management model types of the managed objects as well as the spatial attributes and the temporal attributes expressed in the natural language, the speed and accuracy of the query or subscription can be improved. Similarly, for the historical database and the plan database, it is also preferred to perform query or subscription using the management model types of the managed objects as well as the spatial attributes and the temporal attributes expressed in the natural language.

Another aspect of the present invention provides a device for retrieving data objects based on a spatial-temporal database. The device at least includes a data acquiring module, at least one data computing engine, a spatial-temporal operation database, an engineering base server, a model base server and a client. The data acquiring module collects the operational data of to-be-managed objects and sending the operational data to the engineering base server through the data computing engine. The model base server has a model base provided therein. The model base is configured to model the to-be-managed object in consideration of the temporal status and the spatial status of the to-be-managed object. The engineering base server has an engineering base provided therein. The engineering base is configured to set a specific attribute of the to-be-managed object expressed in a natural language according to the management models of the managed objects. The data computing engine performs spatial and temporal conversion on the modeled managed objects according to the temporal layer and the spatial layer expressed in the natural language. The spatial-temporal operation database includes a historical database, a real-time database and a plan database. The historical database, the real-time database and the plan database are configured to store the historical data, the real-time data and the plan data of the managed objects. The client performs retrieval based on the types of the management models of the managed objects and spatial and/or temporal attributes defined by the models and expressed in the natural language so as to determine the operational status of the to-be-managed objects.

Another aspect of the present invention provides a method for describing articles and events existing in an objective world based on a four-dimensional space. The method comprises modeling the to-be-managed object so as to establish at least the historical database, the real-time database and the plan database that store temporal attribute of the to-be-managed object and the spatial attribute of the to-be-managed object. Therein, modeling the to-be-managed object is achieved by: modeling the to-be-managed object according to the spatial status of the to-be-managed object, modeling the to-be-managed object according to the temporal status of the to-be-managed object, setting the specific attribute of the to-be-managed object, and collecting data from the to-be-managed object so as to enable dynamic monitoring and management of the to-be-managed object.

According to one preferred mode, modeling the to-be-managed object is achieved by at least: sorting the to-be-managed object into a historical data model, a real-time data model and/or a plan data model according to the spatial attribute and/or the temporal attribute, modeling the to-be-managed object according to the spatial status of the to-be-managed object, modeling the to-be-managed object according to the temporal status of the to-be-managed object, setting the specific attribute of the to-be-managed object, collecting data from the to-be-managed object so as to enable dynamic monitoring and management of the to-be-managed object.

According to one preferred mode, the step of modeling the to-be-managed object according to the spatial status of the to-be-managed object at least comprises the following steps: modeling the space of the to-be-managed object according to the spatial status of the to-be-managed object so as to establish a spatial model, and performing instantiation on the spatial model of the to-be-managed object so as to establish a spatial object. The step of modeling the to-be-managed object according to the temporal status of the to-be-managed object comprises the following steps: modeling time of the to-be-managed object according to the temporal status of the to-be-managed object so as to establish a temporal model, and performing instantiation on the temporal model of the to-be-managed object so as to establish a temporal object.

According to one preferred mode, the step of modeling the space of the to-be-managed object according to the spatial status of the to-be-managed object so as to establish the spatial model includes: determine a multi-level spatial model according to the spatial status of the to-be-managed object. The step of modeling the time of the to-be-managed object according to the temporal status of the to-be-managed object so as to establish the temporal model includes determining a multi-level temporal model according to the temporal status of the to-be-managed object.

According to one preferred mode, the spatial model of the to-be-managed object is related to the temporal model of to-be-managed object so as to establish the historical data model, the real-time data model and the plan data model.

According to one preferred mode, the historical data model is instantiated into historical data objects, and the historical data objects are associated with spatial objects generated through instantiation of the spatial model related to the historical data model and with temporal objects generated through instantiation of the temporal model related to the historical data model. The real-time data model is instantiated into real-time data objects, and the real-time data objects are associated with spatial objects generated through instantiation of the spatial model related to the real-time data model and with temporal objects generated through instantiation of the temporal model related to the real-time data model. The plan data model is instantiated into plan data objects, and the plan data objects are associated with spatial objects generated through instantiation of the spatial model related to the plan data model and with temporal objects generated through instantiation of the temporal model related to the plan data model.

According to one preferred mode, the historical data object is assigned with a computer spatial attribute and then becomes a historical database. The real-time data object is assigned with a computer spatial attribute and then becomes a real-time database. The plan data object is assigned with a computer spatial attribute and then becomes a plan database. The historical database stores the historical data of the to-be-managed object, and the real-time database stores the real-time data of the to-be-managed object, while the plan database stores the plan data of the to-be-managed object.

According to one preferred mode, the specific attribute of the to-be-managed object at least includes the temporal attribute of the to-be-managed object and the spatial attribute of the to-be-managed object. The temporal attribute at least includes a temporal location, a start time and an end time. Where the to-be-managed object is a static object, the spatial attribute at least includes a geographic spatial range, a geographic spatial location as well as a shape, a size and a profile. Where the to-be-managed object is a dynamic object, the spatial attribute at least includes a geographic spatial location, a candidate geographic spatial location as well as a shape, a size and a profile of the spatial range of the to-be-managed object.

According to one preferred mode, the specific attribute of the to-be-managed object further comprises attributes of first and second data types of the to-be-managed object. The attribute of the second data type at least includes one or more of a graph attribute, an audio attribute, a video attribute and a name attribute of the to-be-managed object. According to one preferred mode, data is collected from the to-be-managed object through: directly collecting historical data of the to-be-managed object at site from the to-be-managed object or collecting the historical data of the to-be-managed object by means of calculation, collecting real-time data of the to-be-managed object by means of sensors or collecting real-time data of the to-be-managed object by means of calculation, or introducing plan needs through a third-party system interface and generating the plan data by means of calculation.

Another aspect of the present invention provides a method for describing temporal attributes of events and articles and looking up events and articles based on the description. The method comprises modeling a to-be-managed object so as to establish a historical database, a real-time database and a plan database that at least store the temporal attribute of the to-be-managed object and the spatial attribute of the to-be-managed object, and looking up the historical operational status, planned operational status and/or real-time operational status of the to-be-managed object according to the management model type of managed objects, as well as the spatial attribute and/or the temporal attribute of the to-be-managed object. The step of modeling the to-be-managed object at least comprises the following steps: modeling the to-be-managed object according to the spatial status of the to-be-managed object, modeling the to-be-managed object according to the temporal status of the to-be-managed object, setting the specific attribute of the to-be-managed object, and collecting data from the to-be-managed object so as to enable dynamic monitoring and management of the to-be-managed object.

According to one preferred mode, the spatial attribute and/or temporal attribute of the to-be-managed object are of a custom multi-level structure, and the temporal attribute is expressed in a natural language that conforms to industrial production processes and/or customary norms.

According to one preferred mode, the temporal attribute at least includes a temporal location, a start time and an end time. Where the to-be-managed object is a static object, the spatial attribute at least includes a geographic spatial range, a geographic spatial location as well as a shape, a size and a profile. Where the to-be-managed object is a dynamic object, the spatial attribute at least includes a geographic spatial location, a candidate geographic spatial location as well as a shape, a size and a profile of the spatial range of the to-be-managed object.

According to one preferred mode, the method comprises determining a looking up range according to the spatial attribute of the to-be-managed object and then looking up the historical operational status, real-time operational status and/or planned operational status of the to-be-managed object according to the temporal attribute of the to-be-managed object.

According to one preferred mode, the step of modeling the to-be-managed object includes: sorting the to-be-managed object into a historical data model, a real-time data model and/or a plan data model according to spatial attribute and/or temporal attribute; modeling the to-be-managed object according to the spatial status of the to-be-managed object; modeling the to-be-managed object according to the temporal status of the to-be-managed object; setting a specific attribute of the to-be-managed object; and collecting data from the to-be-managed object so as to enable dynamic monitoring and management of the to-be-managed object.

According to one preferred mode, the step of modeling the to-be-managed object according to the spatial status of the to-be-managed object at least comprises the following steps: modeling the space of the to-be-managed object according to the spatial status of the to-be-managed object so as to establish a spatial model, and performing instantiation on the spatial model of the to-be-managed object so as to establish a spatial object. The step of modeling the to-be-managed object according to the temporal status of the to-be-managed object comprises the following steps: modeling the time of the to-be-managed object according to the temporal status of the to-be-managed object so as to establish a temporal model, and performing instantiation on the temporal model of the to-be-managed object so as to establish a temporal object.

According to one preferred mode, the method comprises relating the spatial model of the to-be-managed object to the temporal model of the to-be-managed object so as to establish a historical data model, a real-time data model and a plan data model. The historical data model is instantiated into historical data objects. The historical data object is assigned with a computer spatial attribute and then becomes a historical database for storing the historical data of the to-be-managed object. The real-time data model is instantiated into real-time data objects. The real-time data object is assigned with a computer spatial attribute and then becomes a real-time database for storing the real-time data of the to-be-managed object. The plan data model is instantiated into plan data objects. The plan data object is assigned with a computer spatial attribute and then becomes a plan database for storing the plan data of the to-be-managed object.

According to one preferred mode, the specific attribute of the to-be-managed object at least comprises the temporal attribute of the to-be-managed object and the spatial attribute the to-be-managed object as well as attributes of first and second data types of the to-be-managed object. The attribute of the second data type at least includes one or more of a graph attribute, an audio attribute, a video attribute and a name attribute of the to-be-managed object.

According to one preferred mode, data is collected from the to-be-managed object through: directly collecting historical data of the to-be-managed object at site from the to-be-managed object or collecting the historical data of the to-be-managed object by means of calculation, collecting real-time data of the to-be-managed object by means of sensors or collecting real-time data of the to-be-managed object by means of calculation, or introducing plan needs through a third-party system interface and generating the plan data by means of calculation.

Another aspect of the present invention provides a method for describing spatial attributes of events and articles and looking up events and articles according to the description. The events and articles spatial attribute are described through annotation of the spatial information of the to-be-managed object according to the spatial status of the to-be-managed object, and particularly through: loading a geographic information coordinate system through a spatial object editor, and building a multi-level spatial object based on geographic location information and spatial status information of the to-be-managed object using rectangles, irregular polygons, points and polygonal lines, implementing annotation of the spatial information of individual components of the multi-level structure of the to-be-managed object based on the multi-level spatial object, and looking up events and articles according to the spatial object information of the to-be-managed object.

According to a preferred mode, annotation of the spatial information is performed through: loading the geographic information coordinate system through the spatial object editor, drawing a spatial range of a root node based on the geographic location of the to-be-managed object, and drawing a spatial object in the range of the root node using rectangles, irregular polygons, points and polygonal lines, so as to obtain a first-level spatial object of the to-be-managed object; drawing, based on the upper-level spatial object, spaces of the components of the to-be-managed object level by level using rectangles, irregular polygons, points and polygonal lines, so as to obtain spatial objects of corresponding level to the components; and matching the spatial status of the to-be-managed object to the spatial objects in all levels, thereby achieving annotation of the spatial information to the multi-level and/or multi-layer to-be-managed object.

According to a preferred mode, the spatial attribute of the to-be-managed object is of a multi-level structure customized to an industrial production process. The upper-level spatial object is the parent object of the lower-level spatial object. The lower-level spatial object is the child object of the upper-level spatial object. A child object belongs to a parent object, and a parent object contains at least one child object.

According to a preferred mode, the spatial object describes the spatial attribute of the to-be-managed object, and the spatial object includes description of the spatial shape, spatial range and spatial location of the to-be-managed object.

According to a preferred mode, the step of looking up events and articles according to the description of the spatial attribute of the events and articles is performed through: performing retrieval according to the multi-level and/or multi-layer spatial object information of the to-be-managed object that includes the spatial shape, spatial range and spatial location.

According to a preferred mode, the spatial shape is the physical shape of the to-be-managed object, and the physical shape of the to-be-managed object geometrically describes the spatial shape using points, lines, and planes.

According to a preferred mode, the spatial range is an envelope of the to-be-managed object, wherein the envelope represents the to-be-managed object using rectangles or cubes; and length, width and height of the spatial range are calculated from the spatial shape of the to-be-managed object.

According to a preferred mode, the spatial location describes location information about where the to-be-managed object is located spatially, in which the location information includes exact location information and logic location information, wherein the exact location is at least a geographic coordinate location of the to-be-managed object, and the logic location is location information of and/or relationship between the individual components of the to-be-managed object, which includes location relationship between spatial objects of the same levels and location relationship between spatial objects of different said levels.

According to a preferred mode, the to-be-managed object includes a static object and a dynamic object. The static object includes the case where the exact location and/or logic location of the to-be-managed object is static and the dynamic object includes the case where the exact location and/or logic location of the to-be-managed object is dynamic. The logic location information of the to-be-managed object includes the logic location definition information and logic location relationship information of the to-be-managed object. The logic location of the to-be-managed object is defined as a marking made on the to-be-managed object using the natural language. The logic location relationship information of the to-be-managed object includes the subordinate relationship and/or hierarchical relationship of locations.

Further another aspect of the present invention provides a method for organizing object data. The method for organizing object data includes a defining process of object data and an operating process of object data. The to-be-managed objects is sorted to a corresponding type according to the natural attribute of the object, so that pre-defined type attribute corresponding to the related type is assigned to the data record that is corresponding to the to-be-managed object and incorporate the temporal attribute and the spatial attribute in advance. According to the data record that contains the temporal attribute and the spatial attribute of the to-be-managed object, the data record is related to the natural attribute of the to-be-managed object and instantiation is performed. The data records of the to-be-managed object that have undergone instantiation and are stored in real-time database, the historical database and the plan data are updated for a first time according to the spatial attributes that include the spatial shape, the spatial profile and the spatial location description of the data. The data records that are stored in the real-time database, the historical database and the plan database and have been updated with the spatial attribute are updated for a second time according to the temporal attribute that includes the temporal location, the start time, the end time and/or lapse time. The data that is of the unconventional data type and related to the to-be-managed object is defined as the member information of the to-be-managed object in the form of an observation point. At last, the member information containing the data of the unconventional data type is stored into the database where the corresponding data record is in according to the spatial attribute and/or temporal attribute.

According to a preferred mode, the method for organizing object data further comprises retrieving the member information of the to-be-managed object according to the management model type of the managed object.

According to a preferred mode, the retrieval includes retrieving the member information of the corresponding object of the corresponding type in the corresponding space and time according to the temporal information, the spatial information and the management model type. The retrieval includes retrieving the member information of at least one object corresponding to the type at the corresponding time point or in the corresponding temporal segment according to the types of the temporal information and the member information. The retrieval includes retrieving the member information of the corresponding object in the corresponding space over different temporal segments of the corresponding type according to the types of the spatial information and the member information. The retrieval includes retrieving the member information of at least one object in all time segments and all spaces of the corresponding type according to the type of the member information.

According to a preferred mode, the types of member information at least include a first data type and a second data type. Preferably, the first data type is a conventional data type, such as byte, bool, int8, short, ushort, int32, uint32, int64, uint64, float, double, string, datetime, enum or the like, while the second data type is an unconventional data type, such as one or more of blob, anytime, pen, brush, font, graph, audio, video, name and document. More preferably, the unconventional data type may be a type of date, binary, resource, pen, painting brush and font. In other words, the to-be-managed object can be described in various ways using the member information including date, binary, resource, pen, painting brush and font.

According to a preferred mode, the resource type member information at least includes unconventional type data that is related to the to-be-managed object and is of one or more of the following formats: 2D graph, 3D graph, text, image, XML (a subset of the standard generalized markup language), HTML, report, audio and video information. The resource type member information is introduced by equipment and/or collected by a bottom-layer sensing unit.

According to a preferred mode, the painting brush includes pure color, hatching, texture, linearity and route.

According to a preferred mode, the first-time update of the data record is a process where the real-time database, the plan database and the historical database perform sorting and storing according to the spatial attributes of the object data that express the spatial shape, spatial profile and spatial location of the data.

According to a preferred mode, the second-time update of the data record is a process where the plan database and the historical database perform sorting and storing according to the temporal attribute of the object data, wherein the temporal attribute includes descriptions of the temporal location, the start time and the end time corresponding to the object data. The second-time update of the data record further comprises a process where the real-time database performs sorting and storing according to the temporal attribute of the object data, wherein temporal attribute includes the description of the temporal location, the start time and the lapse time corresponding to the object data.

According to a preferred mode, the method comprises retrieving status information of the data or the to-be-managed object according to the spatial attribute description and/or the temporal attribute description of the data.

According to a preferred mode, the method comprises performing retrieval on status information of events and/or articles contained in the data corresponding to the spatial attribute description in a specific space and over different temporal segments according to the spatial attribute description of the data; performing retrieval on status information of events and/or articles contained in the data corresponding to the temporal attribute description at a specific time and across different spaces according to the temporal attribute description of the data; and performing retrieval on status information of events and/or articles contained in the data corresponding to the spatial attribute description and the temporal attribute description at a specific time and in a specific space according to the spatial attribute description and temporal attribute description of the data According to a preferred mode, the spatial shape is a physical shape corresponding to the object data or the to-be-managed object. The physical shape of the object data geometrically describes the spatial shape using points, lines, and planes. The spatial profile is an envelope corresponding to the object data or the to-be-managed object. The envelope of the data is represented by rectangles or cubes. The original, length, width and height of the spatial profile are calculated from the spatial shape corresponding to the to-be-managed object. The spatial location describes the location information of the object data or the to-be-managed object in the corresponding space. The location information includes exact location information and logic location information. The exact location at least is a geographic coordinate location of the object data or the to-be-managed object. The logic location refers to location information of and/or relationship between the individual components in the object data, and includes location relationship between spatial models of the same level and location relationship between spatial models of different level.

According to a preferred mode, the object data or the to-be-managed object includes corresponding static objects and corresponding dynamic objects. The static object includes the case where the exact location and/or logic location of the to-be-managed object is static and the dynamic object includes the case where the exact location and/or logic location of the to-be-managed object is dynamic. The logic location information of the to-be-managed object includes the logic location definition information and logic location relationship information of the to-be-managed object. The logic location relationship information of the to-be-managed object includes the subordinate relationship and/or hierarchical relationship of locations.

Another aspect of the present invention provides a method for subscribing an object data based on a spatial-temporal database. The method comprises the following steps: having a client send a subscription request for at least one data record to the spatial-temporal database, wherein the subscription request contains a management model type and a spatial attribute and/or a temporal attribute expressed in the natural language; and having the spatial-temporal database actively push, in response to the subscription request, to the client at least one data record containing the spatial attribute and/or temporal attribute of to-be-managed object expressed in the natural language.

According to one preferred mode, the subscription request is sent in a way that is associated with the model types of the to-be-managed object. The model types of the to-be-managed object are attributes of the to-be-managed object built in the real-time database, the historical database and/or the plan database, respectively, and each type of the data models contains one or more objects.

According to one preferred mode of the present invention, the subscription further comprises: when the client is in an on state, having the spatial-temporal database record the subscription request of the client, when the spatial-temporal database detects variation of the data record of the subscription request of the client, having the spatial-temporal operation database actively send at least one data record including the spatial attribute and/or temporal attribute and/or model type of the to-be-managed object to the client; and when the client is in an off state, having the client send a subscription-cancelling request to the spatial-temporal operation database.

According to one preferred mode of the present invention, the step of modeling the spatial-temporal database comprises the following steps: modeling the to-be-managed object according to the spatial status of the to-be-managed object; modeling the to-be-managed object according to the temporal status of the to-be-managed object; setting a specific attribute of the to-be-managed object; and sorting the modeled to-be-managed object to a model of a specific model type according to the specific attribute.

According to one preferred mode of the present invention, the spatial-temporal database includes a real-time database, a historical database and a plan database of the to-be-managed object.

According to one preferred mode of the present invention, the step of modeling the to-be-managed object according to the spatial status of the to-be-managed object includes modeling the space of the to-be-managed object according to the spatial status of the to-be-managed object so as to establish a spatial model. The step of modeling the to-be-managed object according to the temporal status of the to-be-managed object includes modeling the time of the to-be-managed object according to the temporal status of the to-be-managed object so as to establish a temporal model.

According to one preferred mode of the present invention, the step of setting the specific attribute of the to-be-managed object includes setting the attributes of the first and second data types of the to-be-managed object. The attribute of the second data type at least includes one or more of the graph attribute, the audio attribute, the video attribute and the name attribute of the to-be-managed object.

According to one preferred mode of the present invention, the temporal attribute expressed in the natural language is defined by the to-be-managed object according to its temporal status custom, and the temporal attribute of the to-be-managed object expressed in the natural language at least includes a temporal attribute customized according to the temporal location, the start time and the end time custom of to-be-managed object.

According to one preferred mode of the present invention, the spatial attribute expressed in the natural language includes a spatial attribute customized according to the spatial shape, the spatial range and the spatial location of the to-be-managed object.

The present invention at least has the following beneficial technical effects:

(1) In the present invention, data information about monitoring and management of production is described in the three temporal dimensions of the historical aspect, the real-time aspect and the plan aspect, so that a user can easily use the spatial-temporal metalanguage that is relatively natural to check and manage the operational status of the objects over the historical, real-time and plan periods, without learning the computer language; and (2) The present invention uses a database to address various issues about system applications, and helps users to reduce initial investment and maintenance costs of the system. For data query and retrieval, objects in the models can be easily and rapidly searched by space and/or time, facilitating production management.

DETAILED DESCRIPTION OF THE INVENTION

Figure 1:
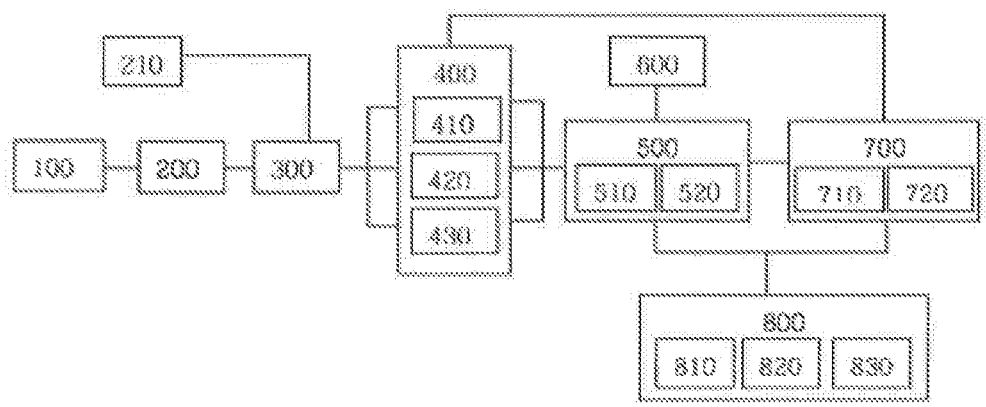
FIG. 1 is a schematic module diagram of a device for retrieving data objects based on a spatial-temporal database.

The invention as well as a preferred mode of use, further objectives and advantages thereof will be best understood by reference to the following detailed description of illustrative embodiments when read in conjunction with the accompanying drawings.

As used herein, a four-dimensional space refers to the three-dimensional space of the to-be-managed object plus a one-dimensional space.

As used herein, a spatial-temporal database refers to a database built using data having temporal attributes and spatial attributes.

As used herein, a spatial-temporal database includes a historical database, a real-time database and a plan database for storing the modeled historical data, real-time data and plan data of the managed object. All the data in the spatial-temporal database have spatial and temporal attributes.

Embodiment 1

The present embodiment provides a method for retrieving data objects based on a spatial-temporal database. The method comprises the following steps.

S1: modeling a to-be-managed object in consideration of temporal statuses and spatial statuses of the to-be-managed object.

A temporal model, a spatial model and/or a management model are built according to temporal statuses and spatial statuses of every to-be-managed object.

The temporal model is a data model for describing the temporal status of a to-be-managed object. The temporal model has a temporal granularity that measures temporal statuses and temporal layers, and includes temporal units and temporal parameters customized according to practical production. Preferably, a temporal model is a model that describes the temporal granularity of the to-be-managed object. For example, the temporal granularity may be year, month, day, hour, minute or second, or may be a customized unit, such as shift or batch.

The spatial model is a data model for describing the spatial status of a to-be-managed object. The spatial model has a spatial granularity that measures spatial parameters such as spatial layers and spatial locations, and includes spatial units and spatial parameters customized according to practical production. For example, the spatial granularity may be headquarters, branch, workshop, production line, production process, station or equipment.

Preferably, the temporal model and the spatial model are multi-level structures labeled with names defined in the natural language. The multi-level structure of the temporal model includes at least one parent-level temporal layer expressed in the natural language and at least one child-level temporal layer corresponding to eh parent-level temporal layer. For example, the temporal layer includes years, months, days, hours, minutes or seconds. Therein, a year is the parent-level temporal layer of a month, and a month is the child-level level of a year. A month is the parent-level temporal layer of a day, and a day is the child-level level of a month. The temporal layer may be orders, work orders and products expressed in the natural language. In this case, an order is the parent-level temporal layer of a work order, and a work order is the child-level level of an order. A work order may correspond to multiple products, yet one product corresponds to a single work order. The multi-level structure of the spatial model includes at least one parent-level spatial layer expressed in the natural language and at least one child-level spatial layer corresponding to the parent-level spatial layer.

A management model is built by relating the spatial model and temporal model of the to-be-managed object to each other. The management model is a data model that describes the spatial status and temporal status of the to-be-managed object. When the data is related to the temporal model and the spatial model, a spatial-temporal model is formed. The spatial-temporal model is a data model that can effectively organize and manage temporal and spatial data, with more complete attribute, spatial and temporal semantics. By monitoring the temporal status and spatial status of the to-be-managed object through the spatial-temporal model, a user can know the operational status of the to-be-managed object well. In the present invention, the spatial-temporal model of the managed object is also referred to as the management model.

Data modeling: every managed object described herein stems from the management model through instantiation.

The management model forms at least one managed object that is composed of the temporal object and spatial object of the managed object related to each other through an instantiation process. Therein, the temporal object of the managed object is formed by the temporal model in the instantiation process, and the spatial object of the managed object is formed by the spatial model in the instantiation process.

For example, equipment is an article, and processing products using the equipment is an event. The product is time, or is a record of the time when the equipment processes the product. This time has a temporal location, a starting production time and an ending production time. The temporal location is a unique product number. If it is a real-time data, it will become a historical data after the product number, the starting production time and the lapse time ends. The lapse time refers to the duration where the product is produced. Afterward, the content about the equipment producing the next time (product) is scanned. The present invention models data of events and articles based on three time periods, namely the past, the present, and the future.

The data model can be divided into a real-time data model, a historical data model, and a plan data model according to the temporal statuses, and can be divided into data, alarms, and events by function. The combinations of time and functions can produce more types of data. The data model has different versions. In a system, a single model may have multiple versions. The instances of the model are corresponding to a certain version of the model. When the model generates its new version, the instances that have been generated will not be affected. When a certain version of the model is modified, the instances generated from that version of the model will be affected.

The data model is a model that describes data. A data model is composed of two parts, namely attributes and members. An attribute is unique to a data, such as its name, description, time and space. The attributes are defined by the system but not the user. Depending on their types, data models may have different attributes. For example, a real-time data has an attribute related to its freshness. An event data has attributes such as a start time, an end time, and a duration time. The members are components of the data, and the user is allowed to describe data in the business using different members according to practical needs. The data of the member may be any type defined above. When performance is taken into consideration, the amount of members shall be limited to 256. Preferably, the limit of 64 characters is applied to the attribute name and the member name.

In the present invention, the management model specifies the temporal model and the spatial model that are related to each other. Herein, the data model containing the temporal model and the spatial model is referred to as the spatial-temporal model. For example, in a model of processing performance at a station, the spatial attribute is the station, and the temporal attribute is shifts. The data may have other attributes, such as the work order number, the amount of processing, the alarm frequency, and the rework frequency. The data in these data models is provided by the calculation model that detects variation of production data. Then data about performance is collected regularly and output to the performance model.

Factory modeling: factory modeling is a process where instantiation is performed on the previous model for a specific factory. The distribution of the real-time data model, the historical data model and the plan data model is instantiated into real-time data objects, historical data objects and plan data objects. For example, the actual factory name, the production line name, the equipment name, and the production process name are results of spatial instantiation. The dependency of individual objects is also determined during the instantiation process. Instances of temporal distribution are, for example, the number of shifts per day, and the duration of every shift. As to the number of production process performance data in an actual production line, it is an instance of the performance data model. Of course, for calculation of the performance data, the calculation model has to be instantiated as well.

System operation: after the system is on, the system backstage automatically detects production information, and records production profile of every production process, so as to ascertain the production performance of every station in a real-time manner. At this point, the production profile of a factory is recorded into the spatial-temporal database in a real-time manner. A user needing information on the real-time and historical production data can thus enter the scene model to make relevant queries.

Setting plans: generally an overall plan, such as a factory-wide annual plan, is first set up and then broken down into sub-plans, such as factory-wide monthly plans, factory-wide daily plans, factory-wide shifts, workshop-specific monthly plans, workshop-specific daily plans, and workshop-specific shift plans. A user only has to breakdown the spaces and time segments with fine granularity, and monitor whether the plans at individual spatial and temporal layers are obeyed while executed.

According to one preferred mode, temporal attributes and spatial attributes are independent of each other. A temporal object is described with a particular level and defined precision. For example, a year has its level set as a year and has its precision set as a second or a millisecond. A temporal object has a temporal location, as well as a start time and an end time of that temporal location in a data record. Taking a temporal location in March 2016 for example, the temporal location has a start time of 0:00:00.000, Mar. 1, 2016 and has an end time of 23:59:59.999, Mar. 31, 2016. Preferably, a temporal location can be defined by the user. For example, March of Fiscal Year 2016 is based on a fiscal year (i.e. a parent temporal layer) and a fiscal month (i.e. a child temporal layer) defined by the user (parent temporal layer) with a start time and an end time defined by the user, such as from Mar. 2, 2016 to Mar. 15, 2016. In this case, where "March of Fiscal Year 2016" is referred to, it means this temporal period.

S2: setting specific attributes of the to-be-managed object that are expressed in a natural language according to a management model of the to-be-managed object.

S21: sorting the modeled to-be-managed object to a specific model according to temporal attribute. The management model includes real-time data objects that are formed according to types of temporal attributes and stored in the real-time database, historical data objects stored in the historical database and plan data objects stored in the plan database.

The historical data object, the real-time data object and the plan data object at least comprise temporal attributes and spatial attributes. The historical objects in the historical data objects are configured with the corresponding spatial attributes of a computer, and historical data will be stored in the historical database of the computer automatically. The real-time objects in the real-time data objects are configured with the corresponding spatial attributes of a computer, and real-time data will be stored in the real-time database of the computer automatically. The plan objects in the plan data objects are configured with the corresponding spatial attributes of a computer, and plan data will be stored in the plan database of the computer automatically.

The historical database, the real-time database and the plan database jointly form the spatial-temporal database of the present invention. The historical database stores the historical data of the to-be-managed object according to the configured conditions. The real-time database stores the real-time value of the to-be-managed object. The plan database stores the plan data of the to-be-managed object. The historical database, the real-time database and the plan database require no configuration from the user. When using the system, the user has to designate a real-time server, a historical server, and a plan server through a configuration interface. During operation of the spatial-temporal database system, ever server client will automatically send data to the corresponding servers. For example, the real-time data client sends the real-time data generated by the system to the real-time data server, and the real-time data server then automatically creates a table or a mapping list in the database, so as to store the data into the database of the relevant server. The same applies to the historical and the plan database. However, the storage mechanism of the present invention is not limited thereto, and other storage mechanisms may be incorporated.

The real-time data objects includes at least one managed object that is formed through the instantiation process of the real-time data model and composed of the real-time data of the managed object. It is instantiated into a real-time data object according to the real-time data model. The spatial model associated with the real-time data model is instantiated into spatial objects. The temporal model associated with the real-time data model is instantiated into temporal objects. The real-time data objects of the managed object are associated with the spatial objects and the temporal objects, respectively. A management model is instantiated into plural managed objects. The plural managed objects as results of instantiation of the same version of the real-time data mode have the same real-time data structure. The plural managed objects formed through instantiation of the real-time data model are stored in the real-time database.

The historical data objects includes at least one managed object that is formed through the instantiation process of the historical data model and composed of the historical data of the managed object. It is instantiated into a historical data object according to the historical data model. The spatial model associated with the historical data model is instantiated into spatial objects. The temporal model associated with the historical data model is instantiated into temporal objects. The historical data objects of the managed object are associated with the spatial objects and the temporal objects, respectively. A management model is instantiated into plural managed objects. The plural managed objects as results of instantiation of the same version of the historical data mode have the same historical data structure. The plural managed objects formed through instantiation of the historical data model are stored in the historical database.

The plan data objects includes at least one managed object that is formed through the instantiation process of the plan data model and composed of the plan data of the managed object. It is instantiated into a plan data object according to the plan data model. The spatial model associated with the plan data model is instantiated into spatial objects. The temporal model associated with the plan data model is instantiated into temporal objects. The plan data objects of the managed object are associated with the spatial objects and the temporal objects, respectively. A management model is instantiated into plural managed objects. The plural managed objects as results of instantiation of the same version of the plan data mode have the same plan data structure. The plural managed objects formed through instantiation of the plan data model are stored in the plan database. The historical data, the real-time data and the plan data are very different in terms of storage.

The real-time data is of a real-time nature. It means that the data exists at the current time point, and is fresh. That is, its data refreshing cycle has to meet its temporal granularity. For example, given that the object has its freshness of 5 seconds, the refreshing cycle shall be 5 seconds. If no refresh happens after 5 seconds, the object becomes old. The real-time data is highly demanding in terms of immediacy, and to maintain its freshness, a capability of refreshing more than one million records per second is required. The data not refreshed timely will lose its freshness and become historical data. The historical data is of a historical nature. It means that the data existed at a past time point. Most historical data of an industrial process is timing data, and can be compressed. The business data in the historical data may be stored in the uncompressed form. The plan data is of a future nature. It means that the data will exist at a future time point. The plan data is obtained through calculation based on the historical data and the real-time data.

The real-time data objects stored in the real-time database is organized according to spatial properties for easy storage and retrieval. The historical data objects and the plan data objects of the historical database and the plan database are first organized according to spatial properties, and then organized according to temporal properties.

According to one preferred mode, the data objects stored in the historical database, the real-time database and the plan database must have temporal attributes. Time is an essential attribute to the to-be-managed object. Without time, no objects can exist. The temporal objects describe the temporal locations of the to-be-managed object. Preferably, the temporal attribute at least includes a temporal location, a start time and an end time. The temporal location of the managed object at least includes the temporal layer and the level precision of the to-be-managed object. For example, production batches from a level. The user can easily call information of the first batch in a certain workshop without specifying the exact temporal segment.

According to one preferred mode, every management model has a unique temporal layer structure and unique spatial layer structure. Taking plan data for example, it describes a production-line-specific (space) shift (time) plan. The production line model and the shift model are implemented-definition spatial and temporal models. After the models are determined, it is assumed that in the engineering phase there are 3 production line objects in the production line model, and there are three shifts (A, B and C) in the shift model. Then the data model can only perform instantiation on the 3 shifts of each of the 3 production lines, namely 9 plan data objects in total, and no instantiation of the plans for other spatial-temporal layers can be done. The temporal layer and the spatial layer of the management model are not alterable once they are established. New versions only appear when there is change in attributes or in members.

Preferably, the space of the to-be-managed object is molded according to the spatial status of the to-be-managed object so as to establish a spatial model. The spatial model having a multi-level structure is instantiated into multi-level spatial objects. According to one preferred mode, instantiation of the multi-level spatial objects includes: loading a map or a CAD drawing of the to-be-managed object using a spatial object editor as a base map; drawing a spatial object in the base map according to the spatial coordinates of the to-be-managed object as a first-level spatial object, and/or drawing a spatial object in the base map according to a custom spatial range as a first-level spatial object; drawing a spatial object in the first-level spatial model as a second-level spatial model, and similarly drawing a spatial object in the (n−1)th-level spatial model as an nth-level spatial model. Particularly, the spatial objects are drawn through the he following steps.

S201: loading a map or a CAD drawing of the to-be-managed object using a spatial object editor as a base map. Preferably, a Google map, Baidu map or a CAD drawing of the to-be-managed object is loaded by the spatial object editor as the base map.

S202: drawing a spatial object in the base map as a first-level spatial model. Preferably, a corresponding coordinate system is selected in the map configuration, and a spatial range of a root is drawn according to the geographic location of the factory. Then in the spatial range of the root, a spatial object is drawn using rectangles, irregular polygons, points and/or polygonal lines, so as to obtain the first-level spatial model.

S203: drawing a spatial object in the first-level spatial model as a second-level spatial model. Preferably, g a spatial object is drawn in the first-level spatial model using rectangles, irregular polygons, points and/or polygonal lines so as to obtain a second-level spatial model.

S204: Similarly, drawing a spatial object in the (n−1)th-level spatial model as the nth-level spatial model. Preferably, a spatial object is drawn in the (n−1)th-level spatial model using rectangles, irregular polygons, points and/or polygonal lines so as to obtain the nth-level spatial model.

S22: setting the specific attribute of the to-be-managed object.

The specific attribute includes a temporal attribute, a spatial attribute and/or a non-spatial-temporal attribute expressed in the natural language. Retrieval of the objects in the model can thus be done easily and fast through data querying by space and/or time. Preferably, in addition to the temporal attribute and the spatial attribute, the to-be-managed object further has a custom non-spatial-temporal attribute.

Preferably, the non-spatial-temporal attribute of the to-be-managed object includes attributes of the first and second data types of the to-be-managed object. The attribute of the second data type at least includes one or more of a graph attribute, an audio attribute, a video attribute and a name attribute of the to-be-managed object. Through "pointillization" of the to-be-managed object, object management for data of various unconventional data types can be achieved, thereby realizing consistent data storage and data calling. Video files are to be displayed. When a video file is sent to a display device as a member of a graph object, the display device creates a display area according to the profile of the graph object, and controls playback of the video by means of a script function. Audio files are to be displayed and provide a voice playing function. For the image type acting as a member of graph objects, when the graph object is transmitted to a display device, the display device displays the drawing image in the screen. A resource object of the file type may be used for transmission and storage of files, such as keeping the process file and giving operation specifications. The graph type is also a data type, and can be used as a member of objects. The coordinates of the graph type are pixel coordinates. The geometric type describes shapes of geographic spatial objects, and needs to be configured in terms of the attribute of spatial objects.

Preferably, the temporal attribute at least includes a temporal location, a start time and an end time. The temporal location refers to the location with respective to the parent spatial model. The spatial attribute of every data in the database includes a geographic spatial range, a geographic spatial location, a shape, size and profile of the child space, a candidate geographic spatial location, a computer space, a candidate computer spatial attribute and so on.

Preferably, where the to-be-managed object is a static object, the spatial attribute at least includes a geographic spatial range, a geographic spatial location as well as a spatial shape, a spatial range and a spatial location of a child space. Where the to-be-managed object is a dynamic object, the spatial attribute at least includes a geographic spatial location, a candidate geographic spatial location as well as a spatial shape, a spatial range and a spatial location of the upper-level spatial model of the to-be-managed object. In an example where a maintenance worker has a spatial range of a workshop and has a spatial location of equipment, the spatial location of the maintenance worker can be described as: the maintenance worker by Equipment 2 of the workshop. In this case, the spatial range is the parent space and the spatial location is the child space.

According to one preferred mode, the sequence of the steps S21 and S22 is not limited.

According to one preferred mode, the data of a managed object stored in the spatial-temporal database includes historical data collected in-site at the place where the managed object is in, real-time data collected by a sensor, and plan data of the to-be-managed object obtained from calculation based on the historical data and the real-time data.

Preferably, the historical data and the plan data are generated through calculation. Preferably, the data in the plan database may be composed from the image at the interface or introduced by software interface of a third-party system. For example, when the plan data is introduced through a third-party program interface or a third-party file, the system recognizes it as the plan data and uses editing and calling algorithms at the interface to conduct calculation and thereby generate the plan data.

S3: performing retrieval based on a type of the management model of the managed objects and a spatial attribute and/or temporal attribute that are expressed in the natural language and defined by the model so as to determine an operational status of one of the managed objects. The real-time data, the historical data and/or plan data of at least one managed object in a spatial location and/or time are searched based on a type of the management model of the managed object, its spatial location and/or time, thereby determining the real-time operational status, the historical operational status and/or planned operational status of at least one to-be-managed object.

Alternatively, the real-time data, the historical data and/or plan data of at least one managed object in a spatial range and/or temporal range are searched based on a type of the management model of the managed object, its spatial range and/or temporal range thereby determining the real-time operational status, the historical operational status and/or planned operational status of at least one to-be-managed object.

The step of performing retrieval based on the management model type of the managed objects and spatial attribute and/or temporal attribute defined by the model and expressed in the natural language so as to determine managed object operational status includes: according to the types of management models of the managed objects determining a real-time database, a historical database and/or a plan database storing operational data of the managed object; according to the spatial attribute and/or the temporal attribute selecting at least one version of the operational data of the managed object that is associated with the managed object from the real-time database, the historical database and/or the plan database; and determining at least one said managed object that is associated with the management model, and checking the real-time data, the historical data and/or the plan data of that managed object, thereby knowing the real-time operational status, the historical operational status and/or planned operational status of at least one to-be-managed object.

Preferably, a user enters data of the spatial attribute, the management model type, and the temporal attribute of the managed object. The system determines the machine node according to the spatial attribute entered by the user, and then determines the real-time database, the historical database and/or plan database that store the operational data of the managed object according to the management model type. Afterward, the specific data is determined according to the temporal attribute. More preferably, after the databases are determined, at least one version of the operational data of the managed object in the real-time database, the historical database and/or plan database that is related to the managed object is selected according to the time and/or spatial location and the temporal range and/or spatial range entered by the user. The user then determines the version of the operational data of the managed object according to the displayed at least one version of the operational data of the managed object and checks the plural managed objects generated through the instantiation of that version of the management model. By selecting the managed object and opening the operational data of the managed object, the user can check the real-time data, the historical data and/or plan data of the managed objects, thereby knowing the real-time operational status, the historical operational status and/or planned operational status of the to-be-managed object.

Embodiment 2

The present embodiment refers to improvements on the basis of Embodiment 1.

According to one preferred mode, the plan data model creates and updates at least one plan data model that contains different versions of the same temporal and spatial statuses according to the version set by the user. In other words, the plan database stores multiple versions of the plan data model. The multiple versions of the plan data model are instantiated into multiple versions of the plan data objects. By selecting one of the multiple versions of the plan data model, the version of the plan data objects can be determined. The plan data objects are the managed objects.

The multi-version mode of the plan data model is significant. A change in a plan leads to a series of corresponding changes in the sub-plans. By using the consistent versions of the plan database, the related plans can be easily found. The plan that is currently set, the plan that is to be released, and the plan that is being executed must be some particular versions of the plan data. For example, in the process of actual operation of a production plan for a workshop, two versions of the plan operational record may be set for a plan data object. In actual production, only one version of the plan data object will be executed. It is thus clear that the version for the plan data model and the version recorded for the plan data object are different.

A user can set and store multiple versions of the plan data model in a computer. Due to the frequent change of the plan records, the plan database will create and maintain multiple versions of plan data objects for the same space and time. For example, in actual operation, the plan operational records for different plan data objects may be updated together. For example, when the workshop plan records change, the shift plan records change as well. The user can update the plans with the changes together, thereby facilitating data review. The real-time data model includes different versions of at least one real-time data model that is created and updated according to the same temporal and spatial statuses. The different versions of the real-time data model are instantiated into different versions of the plan data object and stored in the real-time database.

The same real-time data model may have multiple versions for generating multiple real-time data objects through instantiation. For example, a workshop that has undergone upgrade has a new system and an old system existing in parallel. The new and old systems use two versions of the same data model, respectively. The system objects of both the new and the old versions are monitored, so that when a certain real-time data object upgrades, the system is switched to the new version, and when historical storage is needed, the system stores the historical records corresponding to every version.

According to one preferred mode, the historical data model creates and updates at least one version of the historical data model according to at least one different version of the real-time data model. The different versions of the historical data model are instantiated into different versions of historical data objects that are stored in the historical database.

A historical data object may have multiple versions of its value at the same time. For altering a historical data object, one of the following cases may apply:

1. The version of the historical data value remains unchanged, but the data is altered with the original historical records overwritten.

2. An additional version of the historical data value is generated, meaning that one historical entry is added.

3. The historical data is undeletable.

How the historical data is altered is determined by the user. In the case where the user disallows alteration of the original records, a new version of the historical data records is generated as a result of changes made to the historical data. By performing playback on historical data of different versions of historical data model records, not only the historical data of every system but also the historical changes can be reviews easily. For example, Version V1 of the workshop collecting model supports collection only two parameters, namely temperature and humidity. On the basis of this model, a managed object is set, namely Workshop 1 Object. The collected values of temperature and humidity are store in the historical database. The historical database also records the corresponding version of the model. After a period of operation, the system is upgraded so that in addition to temperature and humidity, values of pressure are also to be collected. So the collecting model is upgraded into Version V2, with a parameter for pressure added. After the upgrade of Workshop 1 Object, Workshop 1 begins to collect values for temperature, humidity and pressure, and stores the corresponding values into the database. In this way, the historical database records the historical data of Workshop 1 in different versions.

As to the collecting management model, there are two parameters for the first version, namely temperature and humidity, and three parameters for the second version, namely temperature, humidity and pressure.

After entering the management model type, the temporal data and/or the spatial data, the user retrieves two versions of the real-time data object, the historical data object, and the plan data object. The user then can use one of the versions of the real-time data object, the historical data object, and the plan data object of the object to know the real-time, the historical or planned operational status of the object. Alternatively, the user can review the both versions of real-time data objects to compare two data existing at the same time.

Embodiment 3

The present embodiment provides a device for retrieving data objects based on a spatial-temporal database. As shown in FIG. 1, a device for retrieving data objects based on a spatial-temporal database, includes data acquiring module 200, at least one data computing engine 300, spatial-temporal operation database 400, engineering base server 500, model base server 600, at least one graph computing engine 700 and client 800. The data acquiring module 200 collects data information of the to-be-managed object 100. The data computing engine 300 converts the collected data. The spatial-temporal operation database 400 includes a real-time database 410, a historical database 420, and a plan database 430. The real-time database 410, the historical database 420 and the plan database 430 store at least one version of the real-time data object, the historical data object and the plan data object that are formed through instantiation of at least one version of the real-time data model, the historical data model and the plan data model. The model base server 600 is provided with a model base. The model base serves to build the temporal model, the spatial model, the management model and the calculation model, for the engineering base 500 to use. The engineering base server 500 is provided with an engineering base. The engineering base serves to introduce models that are related to the solution from the model base 600, for instantiation of the engineering object. The instantiation objects include spatial objects, temporal objects, managed objects and calculation objects. The engineering base server 500 includes an object defining module 510 and a login verification module 520. The object defining module 510 serves to perform instantiation on the modeled objects and define the instantiation expressed in the natural language. The object defining module 510 instantiates the real-time data model, the historical data model, and the plan data model into real-time data objects, the historical data objects, and the plan data objects, respectively. The login verification module 520 serves to verify identity of the user who is trying to retrieve information.

Preferably, the model base, the engineering base, the real-time database 410, the historical database 420 and the plan database 430 are collectively referred to as the spatial-temporal database. More preferably, the developing process, the models and the objects are all object semantics. The models serve to instantiate object semantics. The models are abstract of object types. The object semantics is description of concrete objects. The operating process, the real-time database 410, the historical database 420 and the plan database 430 load semantics information from the engineering base to create operational data objects.

The graph computing engine 700 serves to calculate graph data, retrieval and interactively display the graphs of the client 800. The graph computing engine 700 includes graph a calculating module 710 and a scene-processing module 720. The graph calculating module 710 serves to calculate the graph data. The scene-processing module 720 serves to perform data processing on the scene display. The scene-processing module 720 builds scene models for all equipment of the production workshop. The scene model serves to show the specific attribute and operational status of the production equipment.

The client 800 serves to calculate model interaction through the data retrieval. The client 800 includes a caching module 810, a logining module 820 and a graph refreshing and constructing module 830. The caching module 810 serves to cache the retrieval data and the data displayed. The logining module 820 is used to enter login information and retrieve information. The graph refreshing and constructing module 830 serves to perform parent graph refreshing and/or child graph dynamically building on the content displayed at the client.

The present embodiment further provides a method for a device to retrieve a data object based on a spatial-temporal database. The to-be-managed object is modeled in consideration of temporal statuses and spatial statuses of the to-be-managed object. That is, a temporal model, a spatial model, a management model and a calculation model are built in the model base of the model base server 600 with respect to the temporal status and the spatial status of the to-be-managed object.

For example, a multi-level spatial model is built for a production workshop. The multi-level spatial model includes a workshop model, a production line model and an equipment model. The multi-level spatial model is instantiated into multi-level objects. In the present embodiment, the first-level spatial model is the workshop model, and the second-level spatial model is the production line model, while the 3rd-level spatial model is the equipment model. The spatial objects are the workshop, the production line and the equipment.

To build a temporal model, the temporal parameters defined freely by the user according to the needs in the field such as shifts and batches are stored "in the unit of a shift or a batch." Preferably, temporal layers are defined freely by the user according to the needs in the field as orders, work orders, and products. At this time, the basic temporal attribute includes: a temporal name: product number; a start time: the time the product is on the production line; end time: the time the product is off the production line.

Then a real-time data model is built. As shown in FIG. 1, equipment 100 is set as the to-be-managed object, or the object where data is collected from. The data acquiring module 200 collects data from the to-be-managed object 100. The data acquiring module 200 includes a data acquiring server IOServer. The data acquiring module 200 sends the collected data to the data computing engine 300. The data computing engine 300 sends data model request information to the engineering base server 500. The engineering base server 500 responds to the request from the data computing engine 300, and introduces a real-time data model-Tag (time-second) model that is required by real-time data to the model base server 600, and instantiates the Tag (time-second) model into Tag (time-second) objects according to the real-time collected data sent by the data computing engine 300. The Tag (time-second) object is a first real-time data object. The data computing engine 300 sends the first real-time data object to the real-time database 410 for storage. The temporal layers of the first real-time data object are natural attribute levels, including year, month, date, an hour, minute, and second. The real-time data in the first real-time data object includes the temporal data if every equipment, such as the on-line status, the off-line status, the current product, the current parameter and so on.

The data computing engine 300 may further convert the first real-time data object into a second real-time data object of another temporal layer through calculation according to the temporal layer defined by the user. The computing engine 300 performs dynamic data processing on the real-time data of the first real-time data object according to a preset version, so as to obtain the second real-time data object. For example, the temporal layers in the second real-time data object include order, work order, and product. Therefore, the real-time data of the second real-time data object includes production events of the product in the equipment.

The data computing engine 300 converts the first real-time data object into a historical data object that has gone beyond its fresh stage, and sends it to the historical database 420 for storage. Particularly, when the data acquiring module 200 detects that the equipment is on according to the real-time data, it sets up a first real-time data object. When the data acquiring module 200 detects that the equipment is off according to the real-time data, it stores the event status of the equipment as a historical data object. The data computing engine 300 processes the real-time data object into historical data object through calculation, and stores it in the historical database before zeroing the status of the real-time event.

The data acquiring module 200 further comprises a third-party database 210 or a data-introducing interface device. The data computing engine 300 calculates the plan data object of the production equipment according to the real-time data object and the historical data object. Alternatively, the engineering base server 500 instantiates the plan data model into a first plan data object based on a third-party-introduced plan data. The data computing engine 300 performs dynamic data processing on the first plan data object according to a preset version, so as to obtain a second plan data object that describes production events. The data computing engine 300 sends the second plan data object to the plan database 430 for storage. The real-time data object is stored in the real-time database, and the historical data object is stored in the historical database, while the plan data object is stored in the plan database.

Embodiment 4

The present embodiment explains the previous embodiment using a specific example.

In a case where a user wants to monitor information about Boiler 1 in Factory A, Boiler 1 is the to-be-managed object. The first thing is to build a data model related to Boiler 1, and build temporal and spatial models matching it for positioning or monitoring data information about the boiler. The related data information is thus associated with the temporal model and the spatial model, thereby forming a management model. After the spatial-temporal system and the management model are built, the temporal model and the spatial model are instantiated, respectively, and the management model is instantiated into managed objects. A certain spatial object of the spatial model that is related to the management model has to be selected, and a certain temporal object of the temporal model that is related to the management model has to be selected to be associated with the managed object. For example, the space associated with the real-time data model of Boiler 1 is the boiler spatial model, and the related time is the temporal model of shifts. The spatial model of Boiler 1 after instantiated can give three spatial objects, namely Boiler 1, Boiler 2, and Boiler 3. Boiler 1, Boiler 2, and Boiler 3 are spatial object names defined using the natural language. The shift temporal model after instantiated can give three temporal objects, namely a day shift, a middle shift, and a night shift. The day shift, the middle shift, and the night shift are temporal object names defined using the natural language. The boiler real-time data model after instantiated can give a boiler real-time data object 1. For the real-time data object 1 of the boiler, the related spatial object is Boiler 1, and the related temporal object is the day shift, the middle shift, and the night shift, meaning that the temporal model corresponds to the shift model by default. Since Boiler 1 is a real-time data object, the only space available for computer storage configuration is the real-time database. The modeling and relating processes of the historical database and the plan database are realized in the same manner.

Temporal models are built through the modeling process. To build a shift model, the temporal segments where the shifts are in have to be defined. For example, a day shift may be defined as a temporal segment from 6 AM to 3 PM. To build spatial models, such as a factory model and a boiler model, the spatial shape, spatial range and spatial location of the factory model and the boiler model have to be described. Meanwhile, the factory model is defined as the parent model of the boiler model. To build the management model, the model type has to be set at first. The management model includes the real-time data model, the historical data model and the plan data model. After activation, the storage locations for the real-time data objects, the historical data objects and the plan data objects are determined according to the model types, namely the real-time database, the historical database, and the plan database. Similarly, for responding to a query, the system determines which sub-base in the spatial-temporal database it should go to to look up data according to the management model type. When the system operates, the real-time data objects store the collected values into the real-time database, so that when actual data generates, the system records the information containing, for example, temporal information related to the day shift of Oct. 21, 2016. The day shift information includes the spatial information that is the information on the spatial shape, spatial range and spatial location of the boiler model corresponding to Boiler 1, and include the model type information of the management model corresponding to the boilers as well as other attribute information of the boiler such as the status information of Boiler 1, like color, temperature, chamber pressure and so on.

Meanwhile, the user may retrieve the status of the boiler at a certain time point based on temporal information, the spatial information and the model type information. The user selects the real-time data model. The system determines the real-time database according to the real-time data model of the managed object. After the database is determined, at least one version of the boiler real-time data object that is related to the managed object is selected from the real-time database according to the temporal and/or the boiler name entered by the user. After the version of the boiler real-time data object is determined, one or more of the spatial objects Boiler 1, Boiler 2, Boiler 3 instantiated from the boiler model is selected. By accessing the data of Boiler 1, the user can check the real-time data of Boiler 1, thereby knowing the real-time operational status of Boiler 1. The historical operational status and the planned operational status of Boiler 1 can be checked in the same manner as for checking the real-time operational status of Boiler 1, and the statuses of other boilers can be checked similarly.

Embodiment 5

The present embodiment provides a method for describing articles and events existing in an objective world based on a four-dimensional space. The method is as described in the previous embodiment.

The method will be further explained by reference to the following example.

Figure 2:
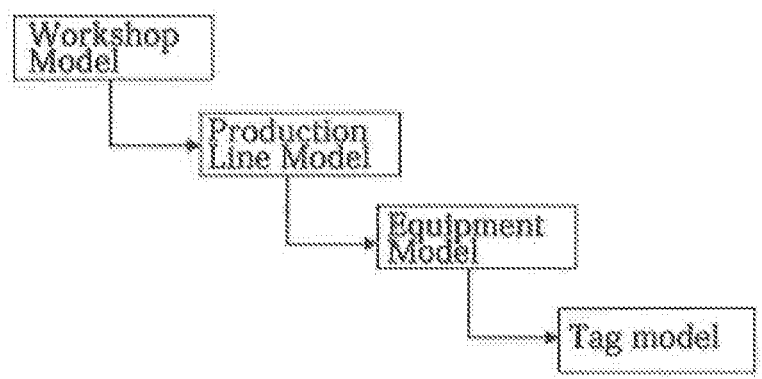
FIG. 2 is a schematic module diagram of a custom spatial model according to one preferred mode of the present invention.
Figure 3:
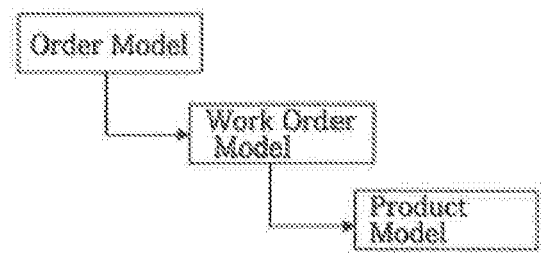
FIG. 3 is a schematic module diagram of a custom temporal model according to one preferred mode of the present invention.
Figure 4:
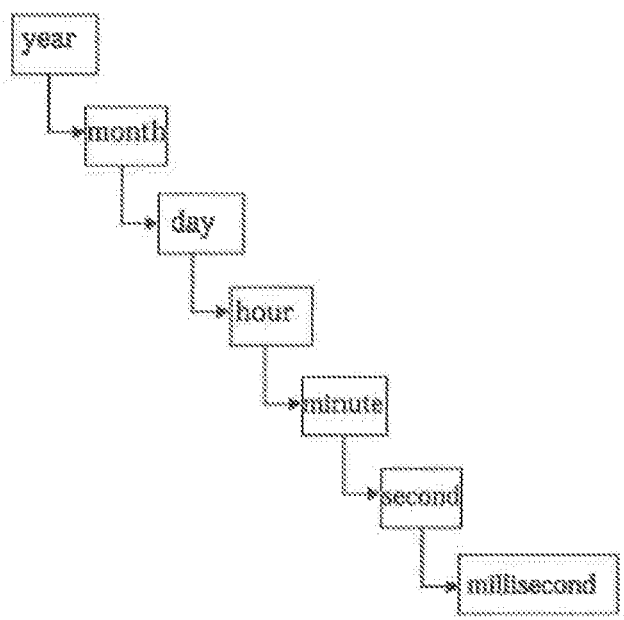
FIG. 4 is a schematic module diagram of a system temporal model according to one preferred mode of the present invention.

For monitoring and managing industrial production, a production order for a workshop is broken down into plural production line work orders. Each of the production line work order is then broken down to the products produced using the equipment in the production line, and modeling is done accordingly with respect to the space and the time. As shown in FIG. 2, the custom spatial models include a workshop model, a production line model, an equipment model and a tag model. As shown in FIG. 3, the custom temporal models include an order model, a work order model and a product model. As shown in FIG. 4, the temporal models coming with the system include year, month, day, hour, minute, second and millisecond.

The reason why the present embodiment breaks down orders, work orders and products into temporal models is that, when production plans are made, a start time and an end time are necessarily assigned to every order, every work order and every product. Preferably, each order, work order and product has a unique name. That is, the order number is unique, and the work order number of a given order is unique, while the product related to a given work order is unique, too.

According to one preferred mode, an order is assigned to a workshop for production, and is broken down into several work orders. Every work order corresponds to a production batch, and a batch generates several products. For spatial and temporal modeling, the order plan is broken down into different plan data models by space and by time. Preferably, the user can define the members that every plan data model concerns according to the spatial-temporal granularity shown in Table 1 below. Preferably, the plan data is introduced or manually entered the system. After the plan data is introduced or entered, the system breaks down the plan data level by level down to the level of equipment products.

Table 1 below shows the temporal granularity and spatial granularity corresponding to different data models.

TABLE 1

| Serial No. | Model Type | Model Name | Temporal Granularity | Spatial Granularity |
|---|---|---|---|---|
| 1 | Real-Time Data Model | Real-Time Data Model 1 | Second | Tag |
| 2 | Real-Time Data Model | Real-Time Data Model 2 | Product | Equipment |
| 3 | Real-Time Data Model | Real-Time Data Model 3 | Work Order | Production Line |
| 4 | Real-Time Data Model | Real-Time Data Model 4 | Order | Workshop |
| 5 | Historical Data Model | Historical Data Model 1 | Product | Equipment |
| 6 | Historical Data Model | Historical Data Model 2 | Work Order | Production Line |
| 7 | Plan Data Model | Plan Data Model 1 | Product | Equipment |
| 8 | Plan Data Model | Plan Data Model 2 | Work Order | Production Line |
| 9 | Plan Data Model | Plan Data Model 3 | Order | Workshop |

Figure 5:
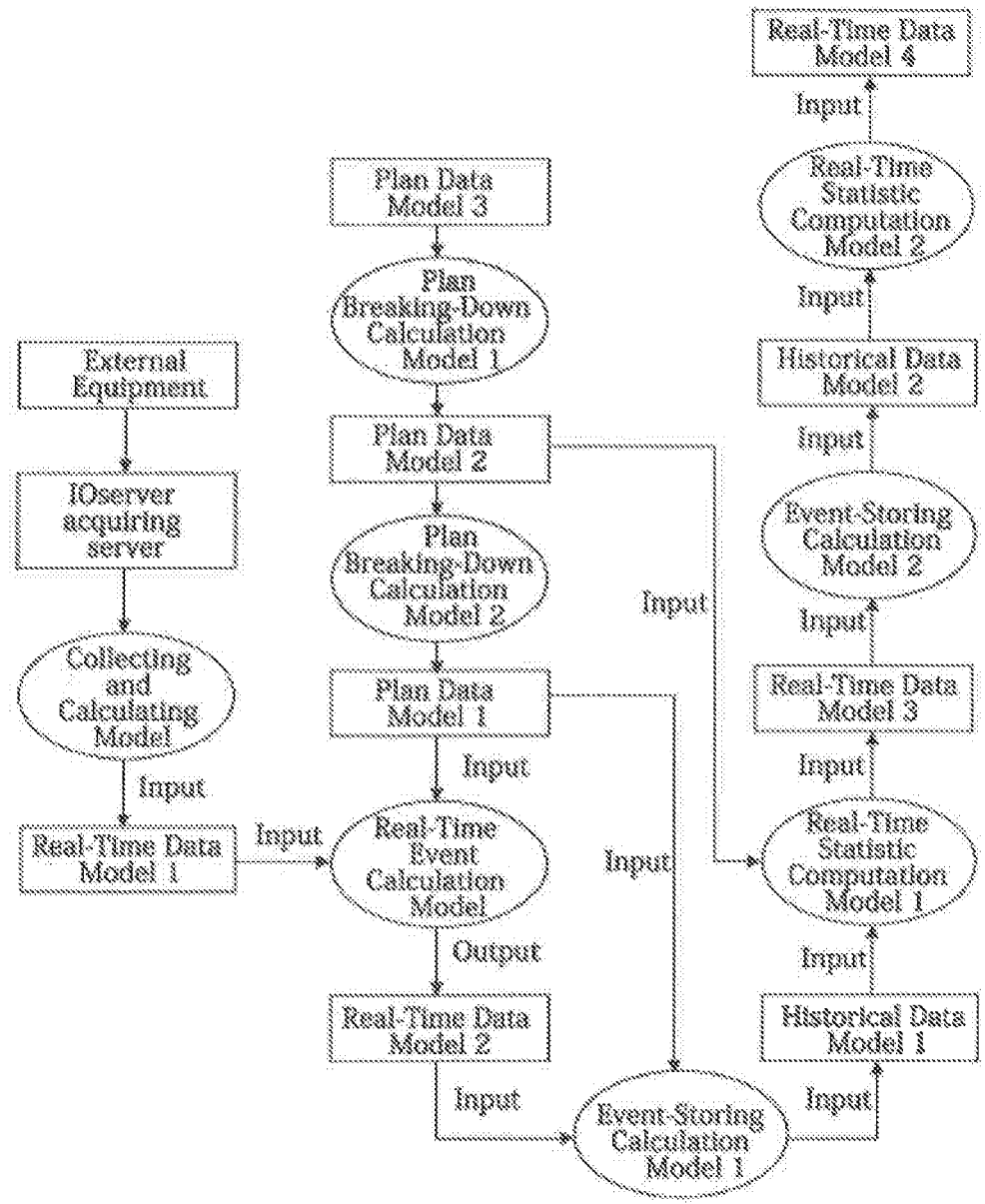
FIG. 5 shows spatial-temporal conversion between data models according to one preferred mode of the present invention.

As shown in FIG. 5, Real-Time Data Models 1~4, Historical Data Models 1 and 2, Plan Data Models 1~3 correspond to the temporal granularity values and spatial granularity values listed in Table 1, respectively. Referring to FIG. 5, Plan Data Model 3 (whose temporal granularity is an order, and whose spatial granularity is a workshop) is processed by Plan Breaking-Down Calculation Model 1 into data objects corresponding to Plan Data Model 2 (whose temporal granularity is a work order, and whose spatial granularity is a production line). Similarly, Plan Data Model 2 is processed by Plan Breaking-Down Calculation Model 2 into data objects corresponding to Plan Data Model 1 (whose temporal granularity is a product, and whose spatial granularity is equipment).

The present embodiment uses the data acquiring server IOServer to collect data of the to-be-managed object into the spatial-temporal database. In the data acquiring server IOServer, data exists in the form of Tag variables. The collecting and calculating model converts the Tag variables into Tag objects recognizable to the spatial-temporal database, so as to obtain data objects corresponding to Real-Time Data Model 1 (whose temporal granularity is a second, and whose spatial granularity is a Tag). The Tag object has, for example, an on-line status, an off-line status, a current product, and a current parameter in every piece of equipment. The status and parameters of every equipment are collected into the by spatial-temporal database through the Tag objects, and production events of the product on the equipment can be calculated using the real-time event calculation model in a real-time manner. In this way, data objects corresponding to dynamically generate Real-Time Data Model 2 (whose temporal granularity is a product, and the spatial granularity is equipment) can be dynamically generated. Preferably, every product has information about the work order it belongs to. If products of a work order in a certain production line are only partially off line, the system records the real-time situation of the production line work order. In the products of the work order product are all off line, it means that the certain work order of the production line is finished and corresponding historical data is generated. In this manner, the real-time progress of the workshop order can be determined through calculation, and the historical progress may further be determined through calculation as desired. Particularly, if the products are on and off line in the equipment, Event-Storing Calculation Model 1 generates historical data of a product in the equipment through calculation of Tag status variation based on the plan data entered by Plan Data Model 1, so as to dynamically generate data objects corresponding to Historical Data Model 1 (whose temporal granularity is a product, and whose spatial granularity is equipment). Real-Time Statistic Computation Model 1 generates real-time data of a work order in the production line through calculation of product status variation based on the plan data entered by Plan Data Model 2, so as to dynamically generate data objects corresponding to Real-Time Data Model 3 (whose temporal granularity is a work order, and whose spatial granularity is a production line). If the work order is on and off a production line, Event-Storing Calculation Model 2 generates historical data of a work order in the production line through calculation of work order status variation, so as to dynamically generate data objects corresponding to Historical Data Model 2 (whose temporal granularity is a work order, and whose spatial granularity is a production line). Real-Time Statistic Computation Model 2 generates real-time data of an order at the workshop through calculation of work order status variation, so as to dynamically generate data objects corresponding to Real-Time Data Model 4 (whose temporal granularity is an order, and whose spatial granularity is a workshop).

Embodiment 6

The present embodiment provides a method for describing temporal attributes of events and articles and looking up events and articles based on the description. The method is as described previously. Preferably, the method involves modeling a to-be-managed object so as to establish a historical database, a real-time database and a plan database that at least store temporal attributes of the to-be-managed object and spatial attributes of the to-be-managed object. The method comprises determining a looking up range according to the spatial attribute of the to-be-managed object and then looking up the historical operational status, real-time operational status and/or planned operational status of the to-be-managed object according to the temporal attribute of the to-be-managed object. The following example explains how the temporal attribute is described.

The duration corresponding to a daily event period, such as a heating season, a fiscal year, and a game season, usually spans calendar years and/or months. For such a time period, the use of standard time is unfavorable to information lookup. For example, in a factory, a natural language, such as the day shift, the middle shift, and the night shift, may be used to describe time segments in the day of Oct. 21, 2016. Therein, the day shift refers to the time period of 08:00~16:00, Oct. 21, 2016. The middle shift refers to the time period of 16:00~24:00, Oct. 21, 2016. The night shift refers to the time period of 0:00~08:00, Oct. 21, 2016. The use of "08:00~16:00, Oct. 21, 2016" to describe the time period in industrial workplace is undesirably complicated and does not conform to the customary practice for industrial production. Also, the standard temporal description is unfavorable to information lookup. The disclosed method for describing temporal attributes of events and articles and looking up events and articles based on the description directly uses a natural language, such as a heating season, a fiscal year, or a game season, that conform to custom and industrial practice to describe temporal attributes of a to-be-managed object so that users can make queries in a way they are familiar to without conducting any temporal conversion, making the data easy to search and use.

Embodiment 7

The present embodiment provides a method for describing spatial attributes of events and articles and looking up events and articles based on the description.

According to one preferred mode, the method of describing spatial attributes of events and articles involves annotating spatial information according to a spatial status of a to-be-managed object, and comprises the steps of: loading a geographic information coordinate system through a spatial object editor, and building a multi-level spatial object based on geographic location information and spatial status information of the to-be-described event or article using rectangles, irregular polygons, points and polygonal lines, and implementing annotation of the spatial information of individual components of the multi-level structure of the to-be-described event or article based on the multi-level spatial object; and looking up the to-be-described event or article based on the spatial object information of the to-be-described event or article.

The spatial object is description of the spatial attribute of the to-be-managed object. The spatial object includes description of the spatial shape, spatial range and spatial location of the to-be-managed object, or description of the shape, size and location of the to-be-managed object. The spatial shape is the physical shape of the to-be-managed object. The physical shape of the to-be-managed object geometrically describes the spatial shape using points, lines, and planes. The spatial range is an envelope of the to-be-managed object, which is represented by rectangles or cubes. Then the origin, length, width and height of the spatial range can be calculated based on the spatial shape of the to-be-managed object. The spatial location is information indicating where the to-be-managed object is in a space. The location information includes exact location information and logic location information. The exact location is at least the geographic coordinate location of the to-be-managed object. The logic location is the location information of and/or relationship between the components in the to-be-managed object, and includes location relationship between spatial objects of the same level and location relationship between spatial objects of different levels.

The logic location information and/or relationship of the to-be-managed object include logic location definition information and logic location relationship information of the to-be-managed object. The logic location definition to-be-managed object is a marking made to the to-be-managed object using the natural language. The natural language marking made to the to-be-managed object may include marking the to-be-managed object as a first group company, a first branch, a first workshop, a first pipeline, a first station or the like. The logic location relationship information of the to-be-managed object includes subordinate relationship and/or hierarchical relationship of the locations. For example, the spatial status of the to-be-managed object is matched to the spatial objects of the group company, so as to provide spatial information annotation to the factory, the workshop subordinate to the factory, and production line and machinery equipment subordinate to the workshop. The to-be-managed object may be a static object or a dynamic object. A static object refers to a to-be-managed object whose exact location is static and/or whose logic location is static. A dynamic object refers to a to-be-managed object whose exact location is dynamic and/or whose logic location is dynamic. For example, a dynamic object may be a piece of equipment or a component in equipment. The equipment or the component of equipment may have its exact location expressed in location information in a map, such as longitude, latitude and altitude. The logic location of the equipment or the component of equipment may indicate that the equipment or the component has moved to or is in a certain production line, in a certain workshop or in a certain factory.

The method for looking up events and articles based on description of their spatial attributes comprises: performing retrieval based on spatial object information of the multi-level and/or multi-layer to-be-managed object. In other words, retrieval of events and articles is conducted based on description of the spatial shape, spatial range and spatial location of the multi-level and/or multi-layer events and articles. For example, retrieval of events and articles is conducted by geometrically describing their spatial shapes using points, lines, and planes. By using the envelope information that describes the origin, length, width and height of the rectangle or cube corresponding to the spatial range of an event or an article, the event or article can be retrieved. Retrieval can be done by describing exact location information and/or logic location information of the event or article in the space. With the method based on description of logic locations of events and articles, the corresponding location information can be found using only their names or other defining information instead of longitude, latitude and altitude information. Meanwhile, with the description information of the logic location of an event or article, the present invention allows queries to be made for subordinate relationship and allows recording and updating of the dynamic exact location and/or dynamic logic location of an event or an article, thereby tracing back the historical location and knowing the real-time location of the event or article.

Embodiment 8

The present embodiment provides a method for object data. Organizing object data includes a data-defining process and a data-operating process. The data-defining process includes defining model base data and engineering base data in spatial and/or temporal dimensions. Preferably, defining data is a process where a spatial-temporal database is modeled based on temporal and spatial attributes of data. The process is as described in previous embodiments. The data-operating process includes updating the real-time database, the historical database and the plan data of different data objects in temporal dimensions. The data-updating process involves organizing or updating data in the real-time database, the plan database and the historical database for a second time according to temporal attributes on the basis of a first time organization or update of the data stored in the real-time database, the plan database and the historical database according to spatial properties of the data.

According to one preferred mode, the method for organizing object data further comprises performing retrieval on member information of the to-be-managed object based on the type of the member information of the to-be-managed object. The retrieval includes, according to the types of temporal information, spatial information and member information, performing retrieval on member information of the corresponding types of the corresponding objects in the corresponding space and time. The retrieval includes retrieving the member information of the corresponding type of at least one object at the corresponding time point or in the corresponding temporal segment based on the types of temporal information and member information. The retrieval includes retrieving the member information of the corresponding type of the corresponding object in the corresponding space over different temporal segments based on the types of spatial information and member information. The retrieval includes retrieving the member information of the corresponding type of at least one object over all temporal segments and in all spaces based on the type of member information. The details of the retrieving method are as described in the previous embodiments.

According to a preferred mode, the type of the member information of the to-be-managed object includes date type, binary, resource, pen, painting brush and font. In other words, the to-be-managed object can be described in various ways using the member information including date, binary, resource, pen, painting brush and font.

According to a preferred mode, the member information of the resource type at least includes unconventional type data that is related to the to-be-managed object and is of one or more of the following formats: 2D graph, 3D graph, text, image, XML (a subset of the standard generalized markup language), HTML, report, audio and video information. The painting brush includes pure color, hatching, texture, linearity and route. For example, it is possible to use painting brush formats featuring different colors, different solid or dotted lines, different grains, different line types and different line routes to describe information of different to-be-managed objects. Similarly, it is possible to use different date data, binary data, resource data, pen data and font data to describe and record information of the to-be-managed object.

For example, where a boiler is a to-be-managed object, the name of the boiler may be defined using a character string of, such as 32 characters, while the temperature and height of the boiler may be defined using a floating-point definition and an integer data definition, respectively. After the attributes of the boiler are defined, a data structure can be formed as: Boiler-name; Boiler-temperature; Boiler height. Where the boiler further has image information (such as a video) and color information (i.e. colors), the 2D graph information and 3D graph information of the boiler cannot be structured and defined using a character string, floating-point definition and an integer data definition, and here comes the unconventional type data. The present invention takes the unconventional data type as a member of the to-be-managed object member and directly introduces it to the to-be-managed object, allowing the to-be-managed object to be described directly using other data types such as ellipses, videos, and colors. The resulting data structure is: Boiler-ellipse; Boiler-video; Boiler-color. This method realizes structured description of the to-be-managed object.

In the process of organizing object data, not only the temporal attribute data and spatial attribute data of the to-be-managed object are organized, but also data information of unconventional data types is defined as an object member in the form of an observation point or a data record section. For example, object members in data records include various data types such as temporal attribute data, spatial attribute data, audio data, video data, image data, enumeration, digital files. The databases can directly store these types of object member data, so users can be released from the troubles of storing and managing them separately. The data can then be directly shown in the interactive interface. Since the unconventional type data is structured, audios, videos, and graphs are all regarded as points, or members of the models. This allows convenient use of the system. On the other hand, the prior-art software requires audios, videos, graphs and other unconventional data types to be separately stored in a separate server. By structurizing unconventional type data, the present invention uses simply an observation point or a member to express object-related data information of an unconventional type.

According to one preferred mode, the data-operating process includes updating data in the real-time database, the historical database and the plan database of different data objects in temporal dimensions. Therein, the data-updating process involves performing a second-time data organizing work on data stored in the real-time database, the plan database and the historical database according to temporal attributes of the data on the basis of a first-time data organizing work according to spatial attributes of the data. In other words, the post-instantiation data record of the to-be-managed object stored in the real-time database, the historical database and the plan data is updated for a first time based on the spatial attributes and then the so updated data record stored in the real-time database, the historical database and the plan data is updated again based on the temporal attributes. Preferably, the first data-organizing or data-updating process is the process where the real-time database, the plan database and the historical database perform data sorting and data storing based on the spatial attributes of the object data. The second data-organizing or data-updating process is the process where the plan database and the historical database perform data sorting and data storing based on the temporal attribute of the object data.

One example described herein is the use of a data graphic member of the present invention. In this case, the spatial-temporal data stored in the databases describes objective events and articles. For example, field temperature value, pressure value, and flow value all concrete data. The spatial information of a spatial-temporal data object, such as the spatial shape, spatial size, spatial location and the temporal information should not only be defined and expressed not only using the natural language but also displayed as graphs.

Taking a space for example, a polygonal graphic member is used to describe the shape of the space. This polygon graphic member in the model phase is a simple polygon having no special meaning. However, in the phase where it is related to a concrete to-be-described data object, the polygonal member displayed in the spatial-temporal data object is exactly the shape of the equipment in the field. Since every spatial object has its shape and geographic coordinates, this coordinate point set can determine the location and size of the data object. The data object has the application scene of the graphic member. It mainly uses a graph to intuitively reflect the spatial data information of the data. This explains why the to-be-managed object supports map display, because every data has its spatial information, and as long as the data object is set to be displayed in the geographic mode for a query session, the data is displayed in the form of a map, and it is further possible to use other graphic members to reflect information about other field process data members within the geographic spatial range of the data, thereby perfectly integrating a map and process data.

In an example where field process data is to be detected, the temperature value is a data member. Generally, the field temperature information is defined to be displayed in screen as a textgraphic member. According to the present invention, there may be a circle graphic member additionally defined so that when the temperature reaches a threshold, the system not only output the temperature value, but also show the circle graphic member in a different color, thereby sending a user more intuitive information. When receiving information in a text format, human brain will first associate the text with some graphs commonly used in the related industry and then it can understand what is happening in the field. Thus, if the detected data is directly expressed in corresponding graphs commonly used in the related industry, the time required for human brain to convert data information can be reduced. The present invention hence allows the use of industry-specific graphs for expression of industry-specific professional data. After the data is collected automatically, the system can configure different graphs for information expression.

A further example is about the use of audio video members for data communication. Through data acquisition, the collected field audio video data can be directly displayed as a real-time data member at a display device. In the prior art, system monitoring and management can only collect data and display it in the form of images. We can say that the known sensor information members that reproduce the field information in the screen with graphs give only flat information to users. Now with audio members and video members, a user in the control room is given with additional eyes and ears for him/her to see the field situation and hear field sound in a real-time manner.

In the present invention, once the time that audio data and video data are collected in a real-time manner, they are stored according to the specified spatial-temporal granularity. For example, when a temperature alarm is triggered in the current shift, the in-site audio video information is recorded at the same time as the temperature alarm appears until the temperature alarm is dismissed. Thus, when a user makes a query for the temperature alarm event object, he/she can only see the spatial information (at which equipment) and temporal information (the duration it lasts) of the temperature alarm, but also call more field information in virtue of the audio video data members. Most important, all the members are stored in the related historical data object, so the user does not need to retrieve and check across numerous third-party databases. Instead, the user can easily retrieve the data stored directly in the spatial-temporal database using simple spatial-temporal query rules.

Plan data in the form of audio video is a common form of field production guidance, and audio video and binary members have been extensively used. The so-called resource types include audio video, word, pdf, and bmp image. For concrete plan data objects, with resource materials related to or introduced to the corresponding resource types, operators in a field station can refer to different resource member information when they conduct field assembling works. This resource may be a video or a pdf guidebook, or a prerecorded audio file of operational guidance.

Audio video is displayed and played through concrete graphic members. For example, when a field worker taps a text member, an audio playing function will be triggered in the graph calculation logic to playback the corresponding audio member information. The worker may further push the video button to trigger a video playing function to play the corresponding video member information. These members are for the user to define and name at will.

With the foregoing pointillization, the present invention can employs diverse data members to allow users to implement various complex functions in the configuration process of the monitoring and management system, and is a perfectly integrated scheme for structurizing unconventional data types. Moreover, this solution can be simply realized by means of configuration instead of using high-level language programming to combine products from different vendors.

Embodiment 9

The present embodiment provides a method for subscribing an object data based on a spatial-temporal database. The present invention adopts a database structure that includes at least temporal attributes and spatial attributes for data objects, so that the object has a data structure that includes a real-time database, a historical database and a plan database. Besides, the database server of the object data is connected and interacts with a client database. When a subscription request is sent to the spatial-temporal operation database through a client, the database server detects whether this act is an ordering act and whether this is the first initialization. Where the server determines that this is an ordering act and is the first initialization, it makes a query according to the spatial-temporal range and data type of the subscription and replies to the client with the search result, so that the client can timely receive changes in the object data, the status or the time, thereby allowing the user to know the related operational status of the object timely.

In the subscription method, the step of modeling the spatial-temporal database at least comprises: organizing data objects. The organizing process further comprises defining the data objects and operating the data objects. The defining process includes 以 the temporal dimension and spatial dimension of the object to define the data object. The temporal dimension of the object includes a data structure having at least three temporal dimensions, thereby forming a data structure that includes an object model base and an engineering object base. The details of the description method are as described in the previous embodiments.

In the present invention, the conversion from the real-time data to the historical data is accomplished by a historical data generating unit. The historical data generating unit performs backstage calculation of the spatial-temporal operation database. The data calculation may be calculation of the real-time data variation of the subscription. Once the real-time data changes, the real-time database sends the changed data records to the historical data generating unit, and the historical data generating unit determines whether it generates the data as historical data according to the calculation logic. Preferably, the data computing unit at the backstage may activate the subscription of the object client by defining a subscription-type data channel.

The spatial dimension of the object data is a data structure that is formed by modeling the object trough a multi-level spatial modeling process according to the spatial status of the object.

According to one preferred mode, the subscription is initiated by a client. The graph calculation channel of the client sends a subscription request that at least comprises temporal attributes and spatial attributes to the spatial-temporal operation database, and when the spatial-temporal operation database determines that the act is a subscription act and is the first initialization, the database server records the spatial-temporal range data and the model type attribute of the subscription request and returns them back the graph calculation channel of the client.

The subscription method further comprises that when the graph calculation of the client remains activated, the database server records the subscription request of the client. The subscription request of the client may be the temporal attribute, spatial attribute and model type attribute of the object. When the server of the spatial-temporal database detects changes in the data searched by the initialization query of the client, the spatial-temporal operation database actively sends the changed data to the graph calculation channel of the client, and the data is stored in the graph calculation channel of the client by a computing engine, so that the client gets the data of the subscription directly from the graph calculation channel. For example, a subscription request may have a temporal attribute of the day shift, a spatial attribute of Boiler 1, a model type of the boiler model. Therein, the start time of the day shift of the temporal attribute may be 8:00, and the end time may be 12:00. The user sends a subscription request including the foregoing object attributes to the spatial-temporal database through the client. Then the spatial-temporal operation database determines whether the request it receives is a subscription request, and whether the subscription request whether is the first initialization data. If so, the spatial-temporal database responds to the subscription request, and detects the related object data in the foregoing range of the subscription request in a real-time manner, namely the operational status data of Boiler 1 in the day shift. When the operational status data record of Boiler 1 in the day shift change, the spatial-temporal operation database actively pushes the operational status data record of Boiler 1 in the day shift to the client.

According to one preferred mode of the present invention, the subscription act is an act of subscribing for the real-time data of objects. That is, once the real-time data of the objects changes, the server notifies the client automatically. According to another preferred mode, the subscription act is an act of subscribing for the historical data and/or plan data of objects. That is, once the historical data of the objects is altered by the data record of the spatial and/or temporal range of the subscription request, the server sends the altered data record to the client. Since alteration of the historical data and plan data can lead to a new version, the client will receive all versions of the data. Thus, when differences exist between the real-time data of an object and the corresponding data in its historical database and/or plan database, the user can know the present operational status of the to-be-managed object immediately.

Particularly, the present invention sets a subscription process in the graph calculation model, and sets the graph calculation channel into the subscription mode, so that in the event of initialization at a client, the database server detects the corresponding object data according to the temporal and spatial range and model type of the client graph calculation, and actively pushes the data to the client. Otherwise, no matter how the client operates, the server will not send data to the client except that the scene is closed and then opened for re-initialization. Only when the data records of the objects in the spatial-temporal range specified in the subscription change, the server sends the changed data records to the graph calculation channel of the client. Preferably, the present invention may perform data processing and calculation on a subscription request from a client by building a subscription-type data channel model at the spatial-temporal operation database.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for retrieving data objects based on a spatial-temporal database,
the method involving modeling a to-be-managed object and performing retrieval based on types of resultant management models and at least one of spatial or temporal attributes of managed objects so as to determine an operational status of the to-be-managed object,
and the method comprising steps of:
modeling the to-be-managed object in consideration of temporal and spatial statuses of the to-be-managed object, wherein the to-be-managed object is a product subject to a work order;
setting a specific attribute of the to-be-managed object expressed in a natural language according to the management models of the managed object;
relating the spatial model of the to-be-managed object to the temporal model of the to-be-managed object;
directly collecting historical data of the to-be-managed object at site from the to be managed object or collecting the historical data of the to-be-managed object by means of calculation;
collecting real-time data of the to-be-managed object by means of sensors or collecting real-time data of the to-be-managed object by means of calculation; and introducing a plan data model through a third-party system interface and generating the plan data by means of calculation;

establishing a historical database for storing historical data of the to-be-managed object, wherein the historical database consists of historical data objects, wherein the historical data objects are instantiated from a historical data model, wherein the historical data model contains historical data entered from an event-storing calculation model, wherein the event-storing calculation model contains real-time data generated by a real-time data model and plan data generated by a plan data model;

establishing a real-time database for storing real-time data of the to-be-managed object, wherein the real-time database consists of real-time data objects, wherein the real-time data objects are instantiated from a real-time data model;

establishing a plan database, wherein the plan database consists of plan data objects, wherein the plan data objects are instantiated from a plan data model; and performing retrieval based on the types of the resultant management models of the managed objects and at least one of spatial or temporal attributes defined by the modeling and expressed in the natural language so as to determine the operational status of the to-be-managed object, and further comprising:

looking up a historical operational status, a planned operational status and a real-time operational status of the to-be-managed object by having the to-be-managed object perform subscription, after establishment of the historical database, the real-time database and the plan database by describing articles and events in a four-dimensional space, wherein the subscription is performed by:

having a client send a query for at least one data record to the spatial-temporal database, wherein the query includes a type of the management model, and the spatial attribute and/or the temporal attribute expressed in the natural language; and having the spatial-temporal database actively push, in response to the query, to the client at least one data record that includes a spatial attribute and/or temporal attribute of to-be-managed object expressed in the natural language;

and after a subscription by spatial-temporal models is performed, a server sends query results again when data variation within a range of a spatial attribute and/or temporal attribute of the to-be-managed object is detected.

2. The method of claim 1, wherein the step of modeling the to-be-managed object at least comprises:

modeling the to-be-managed object according to the spatial status of the to-be-managed object, modeling the to-be-managed object according to the temporal status of the to-be-managed object, setting the specific attribute of the to-be-managed object, and collecting data from the to-be-managed object so as to enable dynamic monitoring and management of the to-be-managed object.

3. The method of claim 1, wherein the step of modeling the to-be-managed object in consideration of the temporal and spatial statuses of the to-be-managed object comprises:

modeling space of the to-be-managed object according to the spatial status of the to-be-managed object so as to establish a spatial model, modeling time of the to-be-managed object according to the temporal status of the to-be-managed object so as to establish a temporal model, and building the management model that is formed by relating the spatial model to the temporal model of the to-be-managed object.

* * * * *